US012770646B2

(12) United States Patent
Numata et al.

(10) Patent No.: US 12,770,646 B2
(45) **Date of Patent: *Oct. 20, 2026**

(54) MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Junki Numata, Kawasaki Kanagawa (JP); Yuji Nakagawa, Kawasaki Kanagawa (JP); Masayuki Takagishi, Kunitachi Tokyo (JP); Naoyuki Narita, Funabashi Chiba (JP); Tomoyuki Maeda, Kawasaki Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/245,844

(22) Filed: Jun. 23, 2025

(65) Prior Publication Data

US 2026/0065928 A1 Mar. 5, 2026

(30) Foreign Application Priority Data

Sep. 3, 2024 (JP) ................................ 2024-151460

(51) Int. Cl.
*G11B 5/31* (2006.01)
*G11B 5/00* (2006.01)

(52) U.S. Cl.
CPC .... *G11B 5/3116* (2013.01); *G11B 2005/0005* (2013.01)

(58) Field of Classification Search
None
See application file for complete search history.

(56) References Cited

U.S. PATENT DOCUMENTS 4,303,956 A * 12/1981 Kobubu ............... G11B 5/4969
4,680,657 A * 7/1987 Naito ....................... G11B 5/33
8,320,079 B2 11/2012 Iwasaki et al.
8,896,947 B2 * 11/2014 Koizumi .................. G11B 5/40 360/59
10,403,308 B2 * 9/2019 Koizumi ................ G11B 5/012
11,393,493 B1 7/2022 Nakagawa et al.
12,068,004 B2 * 8/2024 Nakagawa ............. G11B 20/24
(Continued)

FOREIGN PATENT DOCUMENTS

JP 2022-123251 A 8/2022

*Primary Examiner* — Fred Tzeng
(74) *Attorney, Agent, or Firm* — Knobbe, Martens, Olson & Bear, LLP

(57) ABSTRACT

According to one embodiment, a magnetic recording device includes a magnetic head, and a controller. The magnetic head including a first magnetic pole, a second magnetic pole, a magnetic element provided between the first magnetic pole and the second magnetic pole, a coil, a first terminal, and a second terminal. In the first operation, the controller is configured to supply a recording coil current to the coil while supplying a recording element current to the magnetic element. An absolute value of the recording coil current is equal to or greater than the coil current value. The recording element current is equal to or less than the first current value.

20 Claims, 12 Drawing Sheets

(56) References Cited

U.S. PATENT DOCUMENTS

| | | | | |
|---|---|---|---|---|
| 12,080,325 | B2 * | 9/2024 | Nakagawa | G11B 5/21 |
| 12,154,602 | B2 * | 11/2024 | Nakagawa | G11B 5/1278 |
| 12,190,917 | B2 * | 1/2025 | Nakagawa | G11B 5/1278 |
| 12,308,051 | B2 * | 5/2025 | Nakagawa | G11B 5/1278 |
| 2012/0134054 | A1 | 5/2012 | Takeo et al. | |
| 2021/0104257 | A1 * | 4/2021 | Iwasaki | G11B 5/02 |
| 2022/0005497 | A1 * | 1/2022 | Takagishi | G11B 5/1278 |
| 2022/0068299 | A1 * | 3/2022 | Iwasaki | G11B 5/3116 |
| 2022/0270640 | A1 * | 8/2022 | Nakagawa | G11B 5/3116 |
| 2022/0383898 | A1 * | 12/2022 | Nakagawa | G11B 5/3146 |

* cited by examiner

MAGNETIC RECORDING DEVICE

CROSS-REFERENCE TO RELATED APPLICATIONS

This application is based upon and claims the benefit of priority from Japanese Patent Application No. 2024-151460, filed on Sep. 3, 2024; the entire contents of which are incorporated herein by reference.

FIELD

Embodiments described herein relate generally to a magnetic recording device.

BACKGROUND

Information is recorded on a magnetic recording medium such as a hard disk drive (HDD) by using a magnetic head. In magnetic recording devices, it is desirable to improve the recording density.

DETAILED DESCRIPTION

Figure 1:
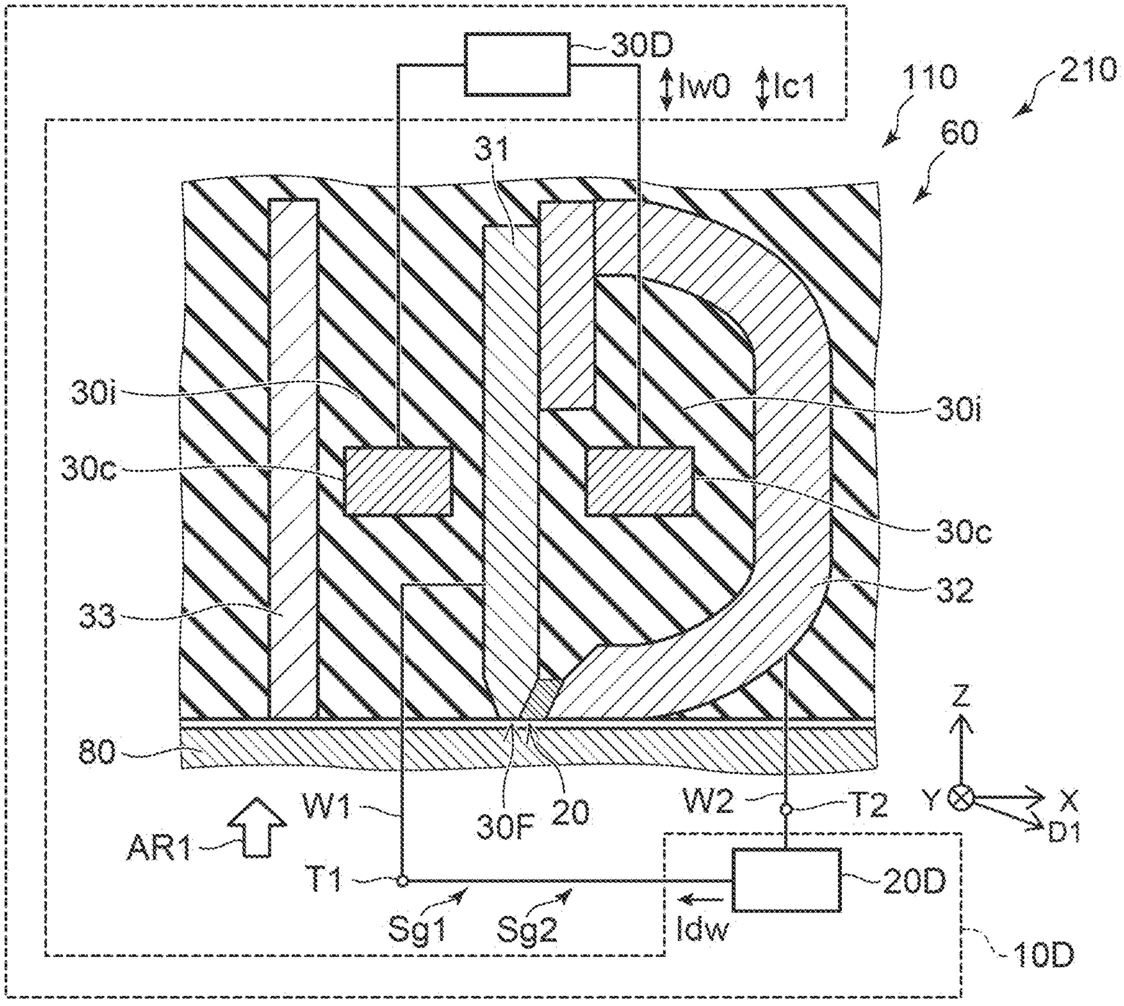
FIG. 1 is a schematic cross-sectional view illustrating a magnetic recording device according to a first embodiment.

According to one embodiment, a magnetic recording device includes a magnetic head, and a controller. The magnetic head including a first magnetic pole, a second magnetic pole, a magnetic element provided between the first magnetic pole and the second magnetic pole, a coil, a first terminal, and a second terminal. The first terminal is electrically connected to a part of the magnetic element. The second terminal is electrically connected to another part of the magnetic element. The magnetic element includes a first magnetic layer, a second magnetic layer provided between the first magnetic layer and the second magnetic pole, a first non-magnetic layer provided between the first magnetic layer and the second magnetic layer, a second non-magnetic layer provided between the second magnetic layer and the second magnetic pole, a third non-magnetic layer provided between the first magnetic pole and the first magnetic layer. When a first coil current of a first frequency is supplied to the coil and a first current is supplied between the first terminal and the second terminal, a first signal having a first signal strength of a first component at the first frequency is generated between the first terminal and the second terminal. When the first coil current is supplied to the coil and a second current is supplied between the first terminal and the second terminal, a second signal having a second signal strength of a second component at the first frequency is generated between the first terminal and the second terminal. An absolute value of the first coil current is greater than or equal to a coil current value. The first current has a first direction from the first magnetic layer to the second magnetic layer. The second current has a second direction from the second magnetic layer to the first magnetic layer. A second absolute value of the second current is the same as a first absolute value of the first current. A change in an absolute value of a difference between a time integration of the first signal strength and a time integration of the second signal strength when the first absolute value is changed includes a first peak and a second peak. A first current value of the first absolute value corresponds to the first peak. A second current value of the first absolute value corresponds to the second peak. The first current value is greater than the second current value. The controller is configured to perform a first operation. In the first operation, the controller is configured to supply a recording coil current to the coil while supplying a recording element current to the magnetic element. An absolute value of the recording coil current is equal to or greater than the coil current value. The recording element current is equal to or less than the first current value.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a magnetic recording device according to a first embodiment.

Figure 2A:
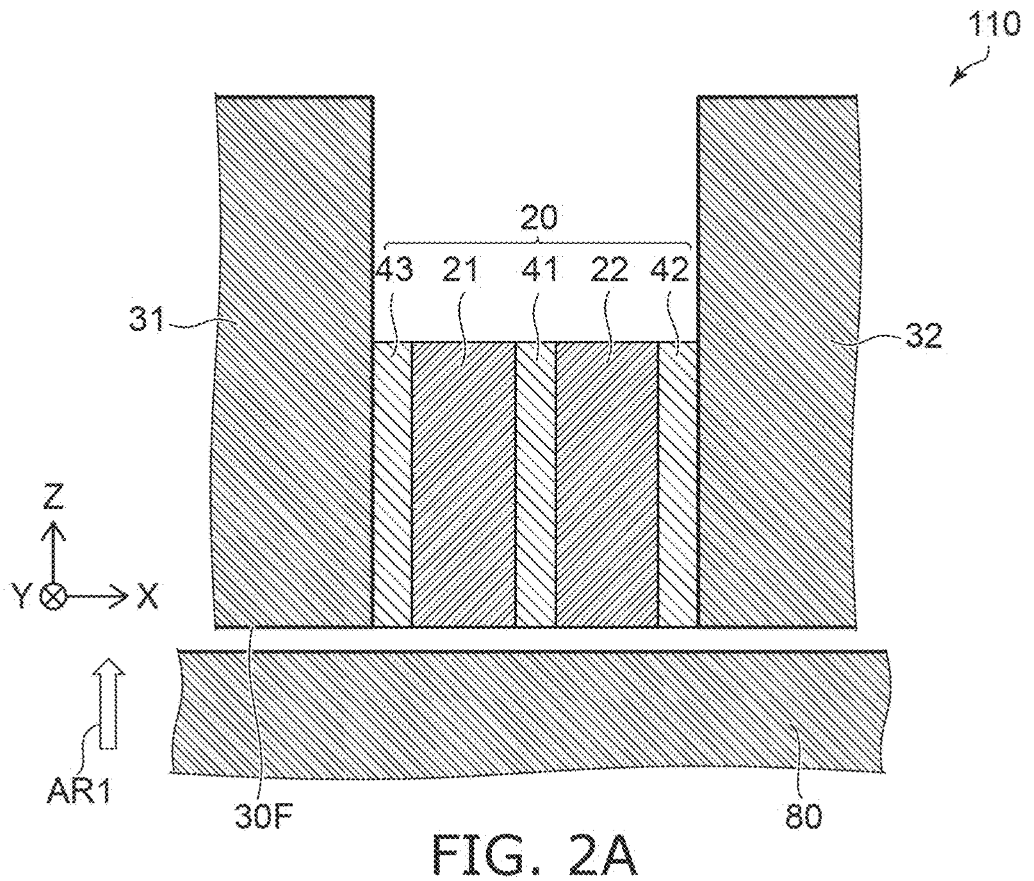
FIGS. 2A and 2B are schematic views illustrating a part of the magnetic recording device according to the first embodiment.
Figure 2B:
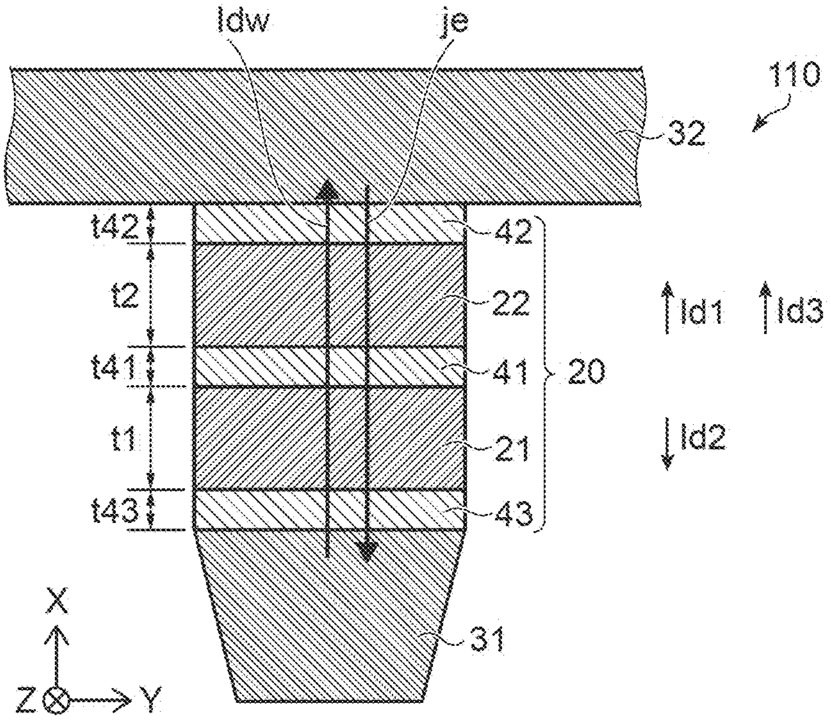

FIGS. 2A and 2B are schematic views illustrating a part of the magnetic recording device according to the first embodiment.

FIG. 2A is a cross-sectional view. FIG. 2B is a plan view seen from the arrow AR1 in FIG. 2A.

Figure 3:
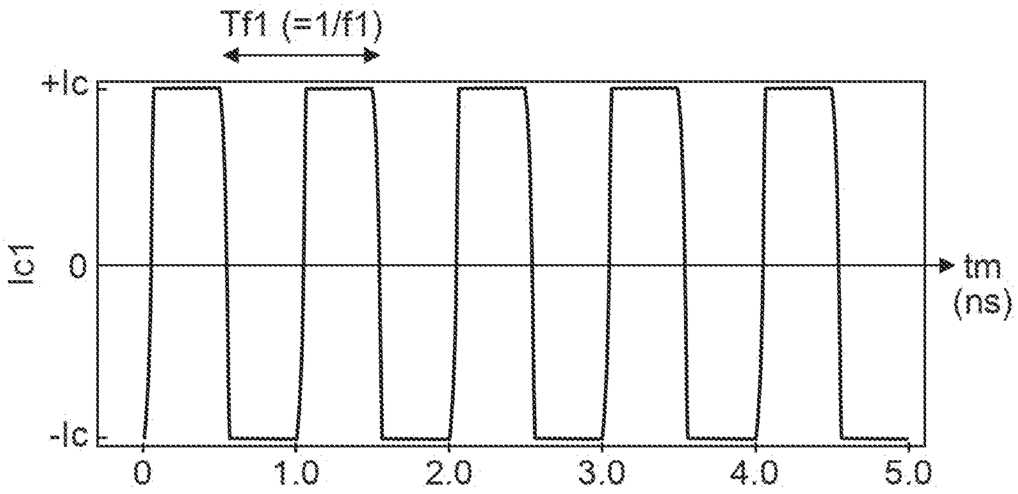
FIG. 3 is a schematic view illustrating the operation of the magnetic recording device according to the first embodiment.

FIG. 3 is a schematic view illustrating the operation of the magnetic recording device according to the first embodiment.

Figure 4A:
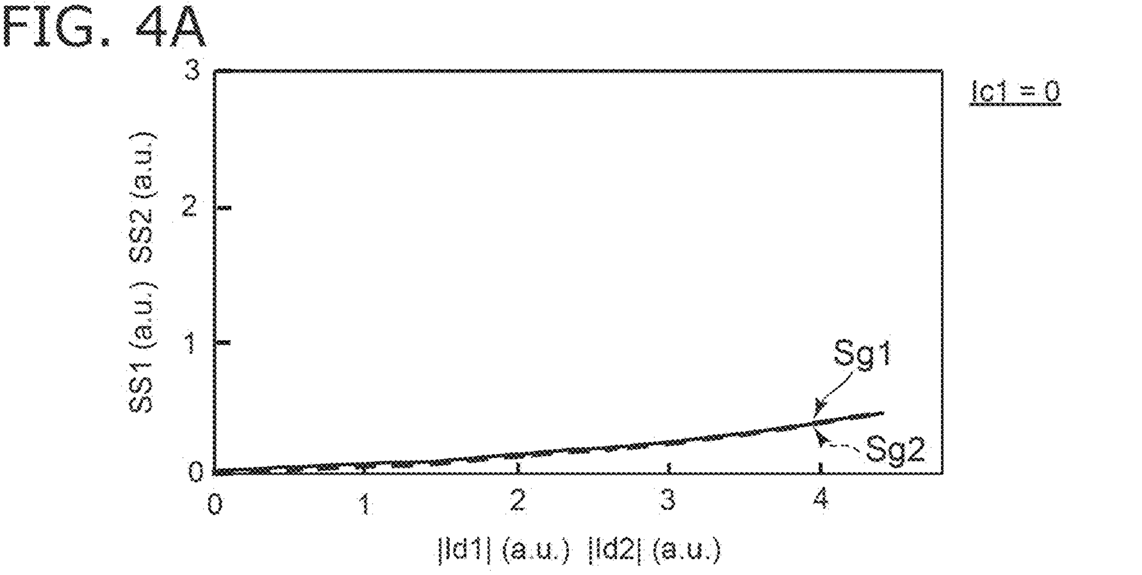
FIGS. 4A to 4C are graphs illustrating the characteristics of the magnetic recording device according to the first embodiment.
Figure 4B:
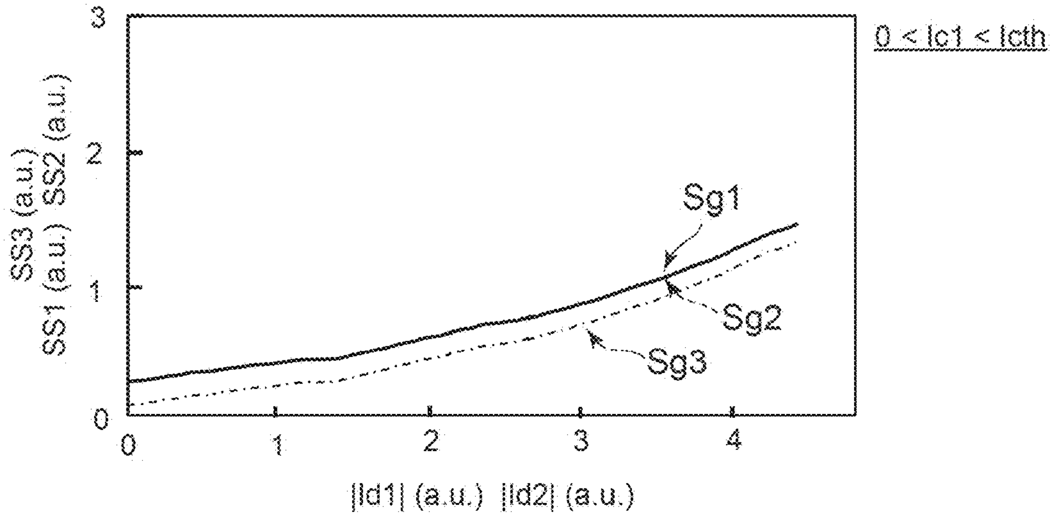
Figure 4C:
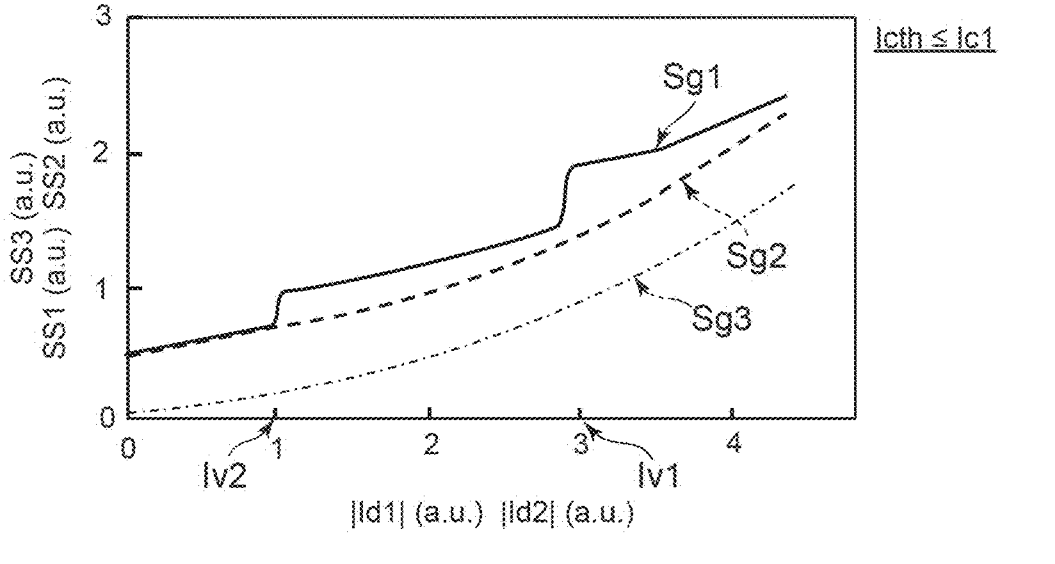

FIGS. 4A to 4C are graphs illustrating the characteristics of the magnetic recording device according to the first embodiment.

Figure 5A:
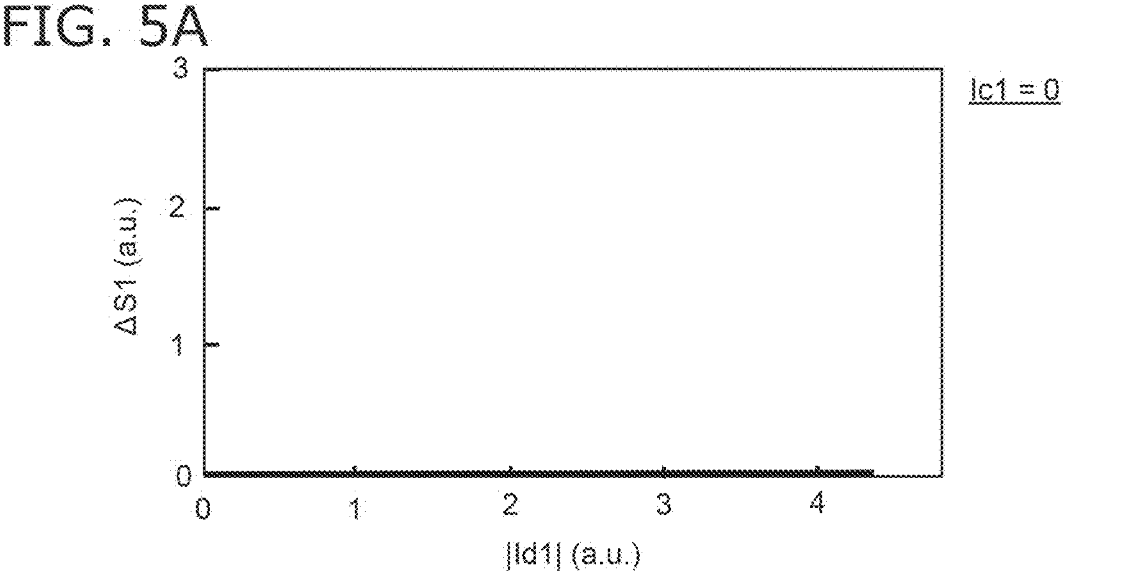
FIGS. 5A to 5C are graphs illustrating the characteristics of the magnetic recording device according to the first embodiment.
Figure 5B:
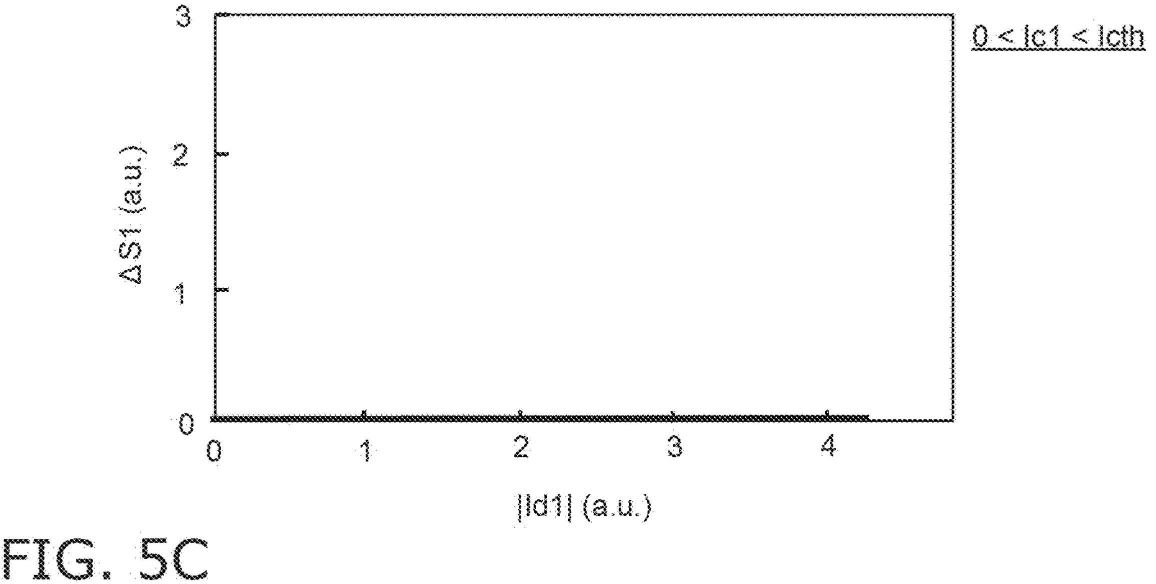
Figure 5C:
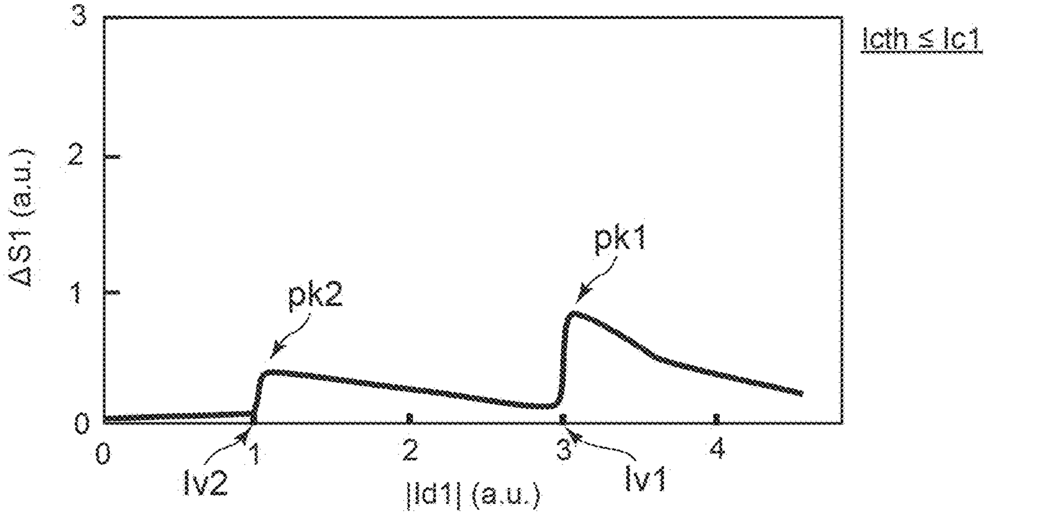

FIGS. 5A to 5C are graphs illustrating the characteristics of the magnetic recording device according to the first embodiment.

As shown in FIG. 1, a magnetic recording device 210 according to the embodiment includes a magnetic head 110 and a controller 10D. The magnetic recording device 210 may also include a magnetic recording medium 80. At least a recording operation is performed in the magnetic recording device 210. In the recording operation, information is recorded on the magnetic recording medium 80 using the magnetic head 110.

The magnetic head 110 includes a recording section 60. As described below, the magnetic head 110 may also include a reproducing section. The recording section 60 includes a first magnetic pole 31, a second magnetic pole 32, and a magnetic element 20. The magnetic element 20 is provided between the first magnetic pole 31 and the second magnetic pole 32.

For example, the first magnetic pole 31 and the second magnetic pole 32 form a magnetic circuit. The first magnetic pole 31 is, for example, a main magnetic pole. The second magnetic pole 32 is, for example, a trailing shield. The first magnetic pole 31 may be the trailing shield and the second magnetic pole 32 may be the main pole.

A direction from the magnetic recording medium 80 to the magnetic head 110 is defined as a Z-axis direction. One direction perpendicular to the Z-axis direction is defined as a X-axis direction. A direction perpendicular to the Z-axis direction and the X-axis direction is defined as a Y-axis direction. The Z-axis direction corresponds to the height direction, for example. The X-axis direction corresponds to the down-track direction, for example. The Y-axis direction corresponds to the cross-track direction, for example. The magnetic recording medium 80 and the magnetic head 110 move relatively along the down-track direction. A magnetic field (recording magnetic field) generated by the magnetic head 110 is applied to a desired position on the magnetic recording medium 80. The magnetization of the desired position on the magnetic recording medium 80 is controlled to a direction according to the recording magnetic field. Thereby, information can be recorded on the magnetic recording medium 80.

A direction from the first magnetic pole 31 to the second magnetic pole 32 is defined as a first direction D1. The first direction D1 is substantially along the X-axis direction. In the embodiment, the first direction D1 may be inclined at a small angle with respect to the X-axis direction.

As shown in FIG. 1, the first magnetic pole 31 includes a medium facing face 30F. The medium facing face 30F is, for example, an ABS (Air Bearing Surface). The medium facing face 30F faces, for example, the magnetic recording medium 80. The medium facing face 30F is, for example, along the X-Y plane.

As shown in FIG. 1, the magnetic head 110 further includes a coil 30*c*. In this example, a part of the coil 30*c* is provided between the first magnetic pole 31 and the second magnetic pole 32. In this example, a shield 33 is provided. In the X-axis direction, the first magnetic pole 31 is located between the shield 33 and the second magnetic pole 32. Another part of the coil 30*c* is located between the shield 33 and the first magnetic pole 31. An insulating portion 30*i* is provided between these multiple elements. The shield 33 is, for example, a leading shield. The magnetic head 110 may also include side shields (not shown).

As shown in FIG. 1, the controller 10D may include a recording circuit 30D and an element electric circuit 20D. A recording current (recording coil current Iw0) is supplied to the coil 30*c* from the recording circuit 30D. A recording magnetic field corresponding to the recording coil current Iw0 from at least one of the first magnetic pole 31 or the second magnetic pole 32 is applied to the magnetic recording medium 80.

As shown in FIG. 1, the element electric circuit 20D is electrically connected to the magnetic element 20. In this example, the magnetic element 20 is electrically connected to the first magnetic pole 31 and the second magnetic pole 32. The magnetic head 110 includes, for example, a first terminal T1 and a second terminal T2. The first terminal T1 is electrically connected to a part of the magnetic element 20. The second terminal T2 is electrically connected to another part of the magnetic element 20. For example, the first terminal T1 is electrically connected to the magnetic element 20 via a first wiring W1 and the first magnetic pole 31. For example, the second terminal T2 is electrically connected to the magnetic element 20 via a second wiring W2 and the second magnetic pole 32. For example, a recording element current Idw is supplied to the magnetic element 20 from the element electric circuit 20D. The recording element current Idw is, for example, a direct current.

As shown in FIGS. 2A and 2B, the magnetic element 20 includes a first magnetic layer 21, a second magnetic layer 22, a first non-magnetic layer 41, a second non-magnetic layer 42, and a third non-magnetic layer 43. In FIGS. 2A and 2B, the insulating portion 30*i* is omitted.

The second magnetic layer 22 is provided between the first magnetic layer 21 and the second magnetic pole 32. The first non-magnetic layer 41 is provided between the first magnetic layer 21 and the second magnetic layer 22. The second non-magnetic layer 42 is provided between the second magnetic layer 22 and the second magnetic pole 32. The third non-magnetic layer 43 is provided between the first magnetic pole 31 and the first magnetic layer 21.

For example, the third non-magnetic layer 43 may be in contact with the first magnetic pole 31 and the first magnetic layer 21. The first non-magnetic layer 41 may be in contact with the first magnetic layer 21 and the second magnetic layer 22. The second non-magnetic layer 42 may be in contact with the second magnetic layer 22 and the second magnetic pole 32.

As shown in FIG. 2B, the recording element current Idw is supplied to such a magnetic element 20. The recording element current Idw is supplied, for example, from the element electric circuit 20D above-mentioned. As shown in FIG. 2B, the recording element current Idw is oriented from the first magnetic layer 21 to the second magnetic layer 22. As shown in FIG. 2B, an electron flow je associated with the recording element current Idw is oriented from the second magnetic layer 22 to the first magnetic layer 21.

For example, when an external magnetic field is applied to the magnetic element 20, the recording element current Idw equal to or greater than a threshold flows through the magnetic element 20. This causes the magnetization of the magnetic layer included in the magnetic element 20 to oscillate. The magnetic element 20 functions, for example, as an STO (Spin-Torque Oscillator). As the oscillation occurs, an AC magnetic field (for example, a high-frequency magnetic field) is generated from the magnetic element 20. The AC magnetic field generated by the magnetic element 20 is applied to the magnetic recording medium 80 to assist a recording to the magnetic recording medium 80. For example, MAMR (Microwave Assisted Magnetic Recording) can be implemented. The recording magnetic field based on the recording coil current Iw0 described above may function as the magnetic field applied to the magnetic element 20.

Below, an example of the characteristics of such a magnetic element 20 will be described.

FIG. 3 illustrates a first coil current Ic1 for test supplied to coil 30*c*. The horizontal axis of FIG. 3 is time tm. The vertical axis is the first coil current Ic1. The first coil current Ic1 changes at a first frequency f1. The first frequency f1 corresponds to the reciprocal of the period Tf1 of the first coil current Ic1. In FIG. 3, the first coil current Ic1 changes between "−Ic" and "+Ic". For example, the absolute value of the first coil current Ic1 corresponds to ½ the amplitude when the first coil current Ic1 is a square wave.

It has been found that when such a first coil current Ic1 for a test is supplied and a current is supplied between the first terminal T1 and the second terminal T2, a specific change occurred between the first terminal T1 and the second terminal T2.

FIG. 4A corresponds to a case where an absolute value of the first coil current Ic1 is 0. FIG. 4B corresponds to a case where the absolute value of the first coil current Ic1 exceeds 0 and is less than a coil current value Icth. The coil current value Icth is, for example, a threshold current, and depends on the configuration of the magnetic element 20, etc. FIG. 4C corresponds to a case where the absolute value of the first coil current Ic1 is equal to or greater than the coil current value Icth.

FIGS. 4A to 4C illustrate a first signal strength SS1 of a first signal Sg1 generated in a first current Id1 when the first current Id1 is supplied to the magnetic element 20. FIGS. 4A to 4C illustrate a second signal strength SS2 of a second signal Sg2 generated in a second current Id2 when the second current Id2 is supplied to the magnetic element 20. The first current Id1 has a first direction from the first magnetic layer 21 to the second magnetic layer 22 (see FIG. 2B). The second current Id2 has a second direction from the second magnetic layer 22 to the first magnetic layer 21.

When the first coil current Ic1 of the first frequency f1 is supplied to the coil 30*c* and the first current Id1 is supplied between the first terminal T1 and the second terminal T2 (i.e., to the magnetic element 20), the first signal Sg1 having the first signal strength SS1 of a first component at the first frequency f1 is generated between the first terminal T1 and the second terminal T2. The first signal Sg1 may be, for example, a voltage signal or a power signal.

When the first coil current Ic1 of the first frequency f1 is supplied to the coil 30*c* and the second current Id2 is supplied between the first terminal T1 and the second terminal T2 (i.e., to the magnetic element 20), the second signal Sg2 having the second signal strength SS2 of a second component at the first frequency f1 is generated between the first terminal T1 and the second terminal T2 (i.e., to the magnetic element 20). The second signal Sg2 may be, for example, a voltage signal or a power signal.

In FIGS. 4A to 4C, the change in the first signal strength SS1 of the first signal Sg1 when the first absolute value |Id1| of the first current Id1 is changed is illustrated by a solid line. In FIGS. 4A to 4C, the change in the second signal strength SS2 of the second signal Sg2 when the second absolute value |Id2| of the second current Id2 is changed is illustrated by a dashed line. In FIGS. 4A and 4B, the dashed line (second signal Sg2) substantially overlaps the solid line (first signal Sg1). In FIG. 4C, the dashed line (second signal Sg2) does not overlap the solid line (first signal Sg1) in most parts.

As shown in FIG. 4A, when the magnitude (amplitude) of the first coil current Ic1 is 0, the first signal strength SS1 of the first signal Sg1 increases gradually as the first absolute value |Id1| of the first current Id1 increases. The second signal strength SS2 of the second signal Sg2 increases gradually as the second absolute value |Id2| of the second current Id2 increases. These phenomena are considered to be due to an increase in thermal fluctuations in the magnetic element 20 as the first absolute value |Id1| of the first current Id1 and the second absolute value |Id2| of the second current Id2 increase. At this time, even if the direction of the current flowing through the magnetic element 20 is reversed, the signal strength does not substantially change.

As shown in FIG. 4B, when the magnitude of the first coil current Ic1 is less than the coil current value Icth (threshold value), the first signal strength SS1 of the first signal Sg1 and the second signal strength SS2 of the second signal Sg2 gradually increase with an increase in the first absolute value |Id1| of the first current Id1 and the second absolute value |Id2| of the second current Id2.

FIG. 4B illustrates the characteristics of a third signal Sg3 having a third signal strength SS3 of a component other than the first frequency f1. In this example, the third signal Sg3 is a component with a frequency 1.1 times the first frequency f1. As shown in FIG. 4B, the strength of the first signal Sg1 of the first component at the first frequency f1 of the first current Id1 is higher than the strength of the third signal Sg3. The strength of the second signal Sg2 of the second component at the first frequency f1 of the second current Id2 is higher than the strength of the third signal Sg3.

The characteristics in FIG. 4B show that the first current Id1 and the second current Id2 supplied to the element are affected by the first coil current Ic1. In FIG. 4B, the effect of the first coil current Ic1 is considered to be an electromagnetic effect caused by the first coil current Ic1 that changes at the first frequency f1.

As shown in FIG. 4C, when the magnitude of the first coil current Ic1 is equal to or greater than the coil current value Icth (threshold value), the first signal strength SS1 of the first signal Sg1 is different from the second signal strength SS2 of the second signal Sg2. This phenomenon is considered to be caused by a change in the state of magnetization of the magnetic layer included in the magnetic element 20 due to the influence of a magnetic field equal to or greater than the threshold value caused by the first coil current Ic1 and the current flowing through the magnetic element 20.

As shown in FIG. 4C, when the first absolute value |Id1| of the first current Id1 and the second absolute value |Id2| of the second current Id2 are small, the first signal strength SS1 of the first signal Sg1 substantially matches the second signal strength SS2 of the second signal Sg2.

When the first absolute value |Id1| of the first current Id1 and the second absolute value |Id2| of the second current Id2 become equal to or greater than the second current value Iv2, the first signal strength SS1 of the first signal Sg1 differs from the second signal strength SS2 of the second signal Sg2.

Below, the difference ΔS1 between a time integration of the first signal strength SS1 of the first component at the first frequency f1 of the first signal Sg1 and a time integration of the second signal strength SS2 of the second component at the first frequency f1 of the second signal Sg2.

FIGS. 5A to 5C show an example of the difference ΔS1 when the first absolute value |Id1| of the first current Id1 is changed. The difference ΔS1 is the difference between the time integration of the first signal strength SS1 of the first component at the first frequency f1 of the first signal Sg1 and the time integration of the second signal strength SS2 of the second component at the first frequency f1 of the second signal Sg2.

As shown in FIG. 5A, when the magnitude (amplitude) of the first coil current Ic1 is 0, the difference ΔS1 is substantially 0.

As shown in FIG. 5B, even when the magnitude of the first coil current Ic1 is less than the coil current value Icth (threshold value), the difference ΔS1 is substantially 0.

FIG. 5C corresponds to the case where the magnitude of the first coil current Ic1 is equal to or greater than the coil current value Icth (threshold value). When the first absolute value |Id1| of the first current Id1 changes, the change in the difference ΔS1 includes peaks (for example, a first peak pk1 and a second peak pk2).

Thus, when the first absolute value |Id1| of the first current Id1 is changed, the change in the absolute value of the difference ΔS1 between the time integration of the first signal strength SS1 and the time integration of the second signal strength SS2 includes a first peak pk1 and a second peak pk2. The first absolute value |Id1| includes a first current value Iv1 corresponding to the first peak pk1 and a second current value Iv2 corresponding to the second peak pk2. The first current value Iv1 of the first absolute value |Id1| corresponds to the first peak pk1. The second current value Iv2 of the first absolute value |Id1| corresponds to the second peak pk2. The first current value Iv1 is greater than the second current value Iv2.

For example, when the magnitude of the first coil current Ic1 is equal to or greater than the coil current value Icth and the first absolute value |Id1| is equal to or greater than the second current value Iv2, the magnetic element 20 is influenced by the first coil current Ic1 and the first current Id1. For example, the magnetic field based on the first coil current Ic1 and the first current Id1 supplied to the magnetic element 20 effectively affect the magnetic element 20. For example, an AC magnetic field is effectively generated from the magnetic element 20. For example, oscillation of magnetization is efficiently obtained.

When the magnitude of the first coil current Ic1 is equal to or greater than the coil current value Icth and the first absolute value |Id1| exceeds the first current value Iv1, it is considered that the magnetic element 20 is excessively affected by the first current Id1. For example, the efficiency of generation of an AC magnetic field from the magnetic element 20 decreases.

Based on the characteristics illustrated in FIG. 4C or FIG. 5C, an appropriate element current (recording element current Idw) may be set in the recording operation.

For example, the controller 10D may be configured to perform a first operation. The first operation corresponds to a recording operation. In the first operation, the controller 10D is configured to supply a recording coil current Iw0 to the coil 30*c* while supplying the recording element current Idw to the magnetic element 20. The absolute value of the recording coil current Iw0 is equal to or greater than the coil current value Icth (threshold value). The recording element current Idw is equal to or less than the first current value Iv1. Thereby, a decrease in the efficiency of generation of an AC magnetic field from the magnetic element 20 is suppressed, for example. An efficient recording operation can be performed. Thereby, a magnetic recording device that can improve recording density can be provided.

In the embodiment, the recording element current Idw may be equal to or greater than the second current value Iv2. The effects of the magnetic field based on the first coil current Ic1 and the first current Id1 supplied to the magnetic element 20 act more effectively on the magnetic element 20. For example, an AC magnetic field is generated more effectively from the magnetic element 20.

As shown in FIG. 5C, the first current value Iv1 is substantially three times the second current value Iv2. In the embodiment, the first current value Iv1 may be not less than 2.5 times and not more than 3.5 times the second current value Iv2.

A first height of the first peak pk1 may be higher than a second height of the second peak pk2. The first peak pk1 may be clearer than the second peak pk2.

The changes in the first peak pk1 and the second peak pk2 in response to an increase or decrease in the absolute value of the first current Id1 may be asymmetric. In this example, the steepness of the change in the first peak pk1 when the absolute value of the first current Id1 changes in a range less than the first current value Iv1 is higher than the steepness of the change in the first peak pk1 when the absolute value of the first current Id1 changes in a range greater than the first current value Iv1. The steepness of the change in the second peak pk2 when the absolute value of the first current Id1 changes in a range less than the second current value Iv2 is higher than the steepness of the change in the second peak pk2 when the absolute value of the first current Id1 changes in a range greater than the second current value Iv2.

An example of the characteristics related to the differential resistance of the magnetic element 20 will be described below.

Figure 6:
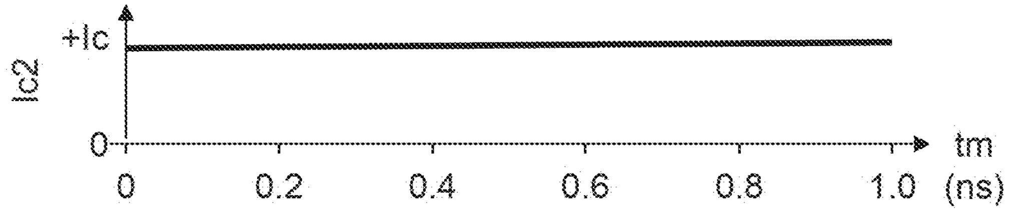
FIG. 6 is a schematic diagram illustrating another operation of the magnetic recording device according to the first embodiment.

FIG. 6 is a schematic diagram illustrating another operation of the magnetic recording device according to the first embodiment.

As shown in FIG. 6, a second coil current Ic2 of DC is supplied to the coil 30*c*. The absolute value of the second coil current Ic2 is equal to or greater than the coil current value Icth (threshold value). In this state, when the third current supplied to the magnetic element 20 is changed, the electrical resistance (differential resistance) of the magnetic element 20 may change in response to the third current. The third current has the first direction from the first magnetic layer 21 to the second magnetic layer 22 (see FIG. 2B).

Figure 7A:
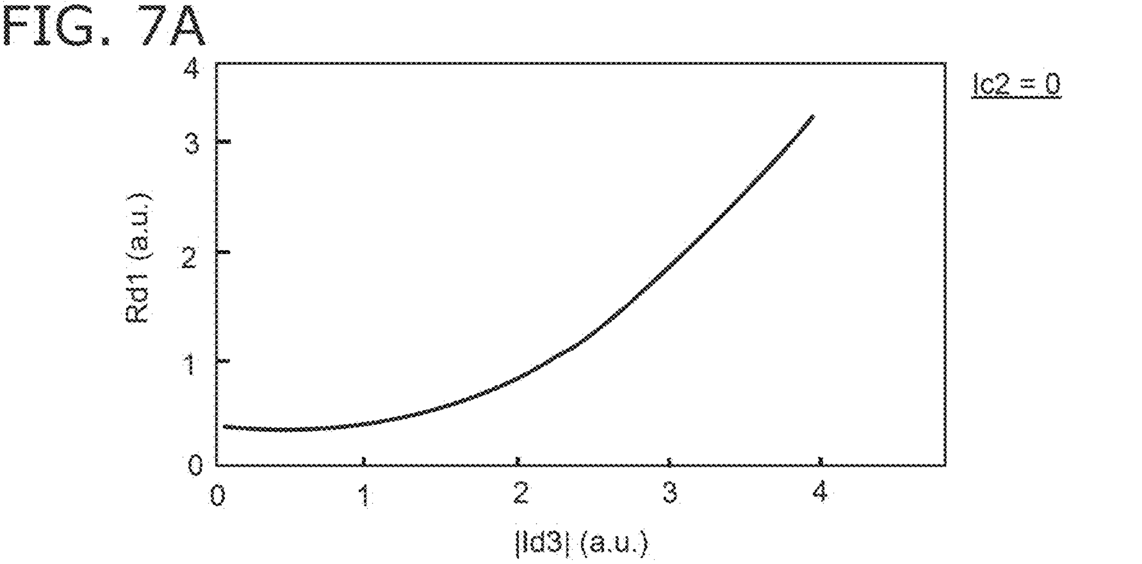
FIGS. 7A to 7C are graphs illustrating the characteristics of the magnetic recording device according to the first embodiment.
Figure 7B:
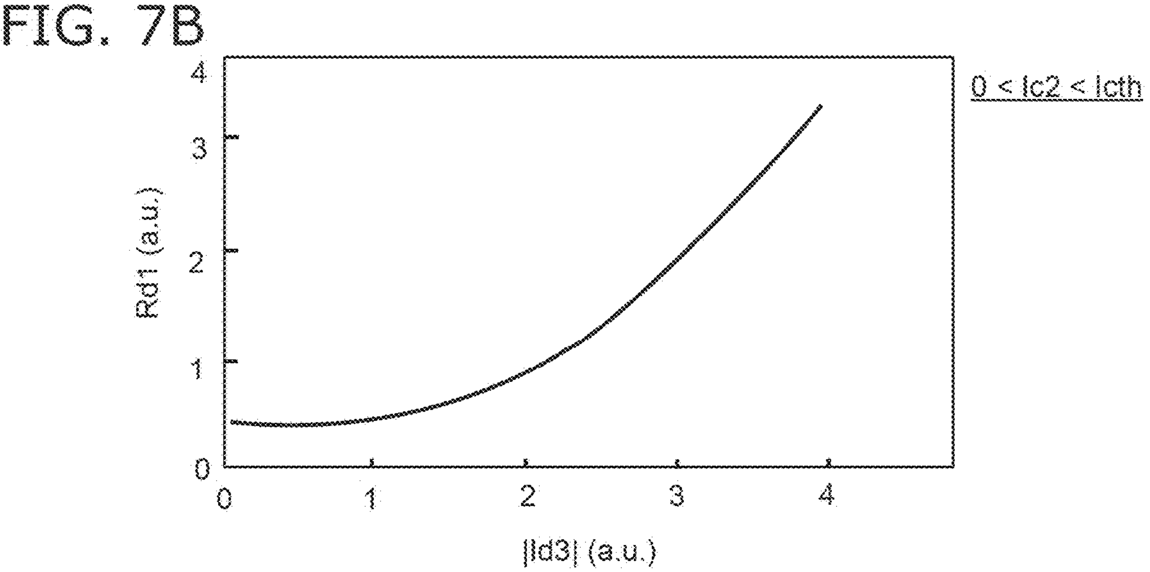
Figure 7C:
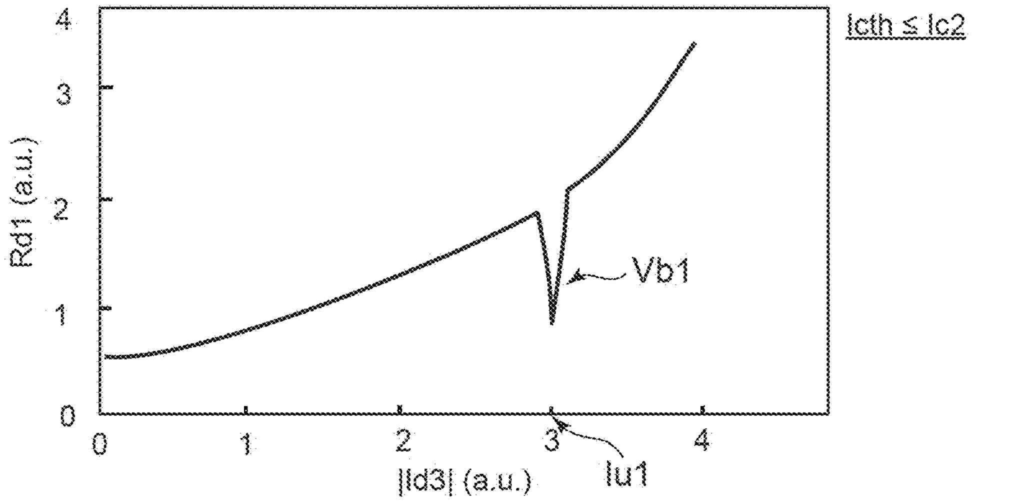

FIGS. 7A to 7C are graphs illustrating the characteristics of the magnetic recording device according to the first embodiment.

The horizontal axis of these figures is a third absolute value |Id3| of the third current Id3. The vertical axis of these figures is a differential resistance Rd1 of the magnetic element 20. FIG. 7A corresponds to a case where the magnitude (amplitude) of the second coil current Ic2 is 0. FIG. 7B corresponds to a case where the magnitude of the second coil current Ic2 exceeds 0 and is less than the coil current value Icth (threshold value). FIG. 7C corresponds to a case where the magnitude of the second coil current Ic2 is equal to or greater than the coil current value Icth (threshold value).

As shown in FIG. 7C, when the magnitude (third absolute value |Id3|) of the third current Id3 supplied between the first terminal T1 and the second terminal T2 (i.e., to the magnetic element 20) changes while the second coil current Ic2 of DC is supplied to the coil 30*c*, the change in the differential resistance Rd1 of the magnetic element 20 with respect to the change in the magnitude of the third current Id3 includes a valley Vb1. The differential resistance Rd1 may include a gradually increasing background. This increase is considered to be due to heat generation resulting from the flow of the third current Id3. The magnitude (third absolute value |Id3|) of the third current Id3 corresponding to the valley Vb1 is the first valley current value Iu1.

The valley Vb1 is thought to correspond to, for example, a change in the magnetization state of each of the plurality of magnetic layers included in the magnetic element 20. For example, when a current equal to or less than the first valley current value Iu1 is supplied to the magnetic element 20, the magnetization of each of the multiple magnetic layers included in the magnetic element 20 is thought to oscillate stably. For example, when a current exceeding the first valley current value Iu1 is supplied to the magnetic element 20, the oscillation state of the magnetization of each of the multiple magnetic layers included in the magnetic element 20 is thought to deteriorate.

In the embodiment, it is preferable that the recording element current Idw is equal to or less than the first valley current value Iu1. Thereby, efficient oscillation can be obtained, for example.

The first valley current value Iu1 may be substantially equal to the first current value Iv1. For example, ⅓ of the first valley current value Iu1 may be substantially equal to the second current value Iv2. For example, the first valley current value Iu1 may be not less than 2.5 times and not more than 3.5 times the second current value Iv2.

In the embodiment, at least one of the first peak pk1 or the second peak pk2 may not be sufficiently clear. In this case, the recording element current Idw may be determined based on the first valley current value Iu1.

For example, when the magnitude of the third current Id3 supplied between the first terminal T1 and the second terminal T2 (i.e., to the magnetic element 20) changes while the second direct coil current Ic2 is supplied to the coil 30*c*, the change in the differential resistance Rd1 of the magnetic element 20 with respect to the change in the magnitude of the third current Id3 includes the valley Vb1 in the third current Id3 of the first valley current value Iu1. The absolute value of the second coil current Ic2 is equal to or greater than the coil current value Icth. The third current Id3 has the first direction from the first magnetic layer 21 to the second magnetic layer 22. The controller 10D is configured to perform the first operation. In the first operation, the controller 10D is configured to supply the recording coil current Iw0 to the coil 30*c* while supplying the recording element current Idw to the magnetic element 20. The absolute value of the recording coil current Iw0 is equal to or greater than the coil current value Icth. The recording element current Idw may be equal to or less than the first valley current value Iu1. For example, efficient oscillation can be obtained. The recording element current Idw may be equal to or more than 0.3 times the first valley current value Iu1.

In the embodiment, at least one of the first non-magnetic layer 41, the second non-magnetic layer 42, or the third non-magnetic layer 43 includes a third element. The third element includes, for example, at least one selected from the group consisting of Cu, Au, Cr, V, Al, and Ag. In a non-magnetic layer including such a material, for example, a high spin transmittance is obtained. For example, a high oscillation intensity is obtained.

At least one of the second non-magnetic layer 42 or the third non-magnetic layer 43 may include a fourth element. The fourth element includes, for example, at least one selected from the group consisting of Ru, Ir, Ta, Rh, Pd, Pt, and W. In a non-magnetic layer including such a material, for example, a low spin transmittance is obtained. For example, stable oscillation is easily obtained. At least one of the second non-magnetic layer 42 or the third non-magnetic layer 43 may include the third element and the fourth element described above.

In the embodiment, the first magnetic layer 21 includes a first element. The first element includes at least one of Fe, Co, and Ni.

The second magnetic layer 22 includes a first element and a second element. The second element includes at least one selected from the group consisting of Cr, V, Mn, Ti, and Sc. The first magnetic layer 21 does not include the second element. Alternatively, a concentration of the second element in the first magnetic layer 21 is lower than a concentration of the second element in the second magnetic layer 22.

For example, the concentration of the second element in the second magnetic layer 22 is not less than 10 atomic % and not more than 80 atomic %. The second magnetic layer 22 including such a material has, for example, a negative spin polarization. On the other hand, for example, the first magnetic layer 21 has a positive spin polarization.

The first magnetic layer 21 and second magnetic layer 22 provide a stable, high-strength AC magnetic field.

In the magnetic head 110, the first magnetic layer 21 and the second magnetic layer 22 function, for example, as an oscillation layer. For example, a negative transmitted spin torque from the second magnetic layer 22 acts on the first magnetic layer 21. For example, a spin torque reflected by the first magnetic layer 21 acts on the second magnetic layer 22. For example, the magnetization of the first magnetic layer 21 and the magnetization of the second magnetic layer 22 rotate while interacting with each other.

As shown in FIG. 2B, a thickness of the first magnetic layer 21 along the first direction (the direction from the first magnetic pole 31 to the second magnetic pole 32) is defined as a first thickness t1. A thickness of the second magnetic layer 22 along the first direction is defined as a second thickness t2. In the embodiment, for example, the first thickness t1 may be the same as the second thickness t2. Thereby, it becomes easier to obtain oscillation, as described below.

A thickness of the first non-magnetic layer 41 along the first direction is defined as a thickness t41. A thickness of the second non-magnetic layer 42 along the first direction is defined as a thickness t42. A thickness of the third non-magnetic layer 43 along the first direction is defined as a thickness t43. These thicknesses are, for example, not less than 0.5 nm and not more than 6 nm. Stable oscillation becomes easier when these thicknesses are 0.5 nm or more. Stable oscillation becomes easier when these thicknesses are 6 nm or less, for example, to increase the spin transmittance. For example, high oscillation intensity becomes easier to obtain.

A ratio of the first thickness t1 to the second thickness t2 (i.e., t1/t2) is defined as a thickness ratio R1. When the thickness ratio R1 is close to 1, a high oscillation intensity is obtained. For example, when the thickness ratio R1 is not less than 0.25 and not more than 4, stable oscillation is obtained. The thickness ratio R1 may be 0.33 or more. A higher oscillation intensity is obtained. The thickness ratio R1 may be 3 or less. A higher oscillation intensity is obtained.

In the embodiment, the first thickness t1 is preferably not less than 0.25 times and not more than 4 times the second thickness t2. Thereby, high oscillation strength is obtained. Stable oscillation is obtained. The first thickness t1 may also be not less than 0.33 times and not more than 3 times the second thickness t2. Higher oscillation strength is obtained.

More stable oscillation is obtained. According to the embodiment, stable MAMR can be implemented. A magnetic head that allows for improved recording density can be provided.

The first thickness t1 is preferably 5 nm or more. The first thickness t1 may be, for example, 20 nm or less. For example, the distance between the first magnetic pole 31 and the second magnetic pole 32 (for example, the recording gap) can be shortened. For example, a high recording density is easily obtained. The second thickness t2 is preferably 5 nm or more. The second thickness t2 may be, for example, 20 nm or less. For example, the recording gap can be shortened. For example, a high recording density is easily obtained. The sum ts of the first thickness t1 and the second thickness t2 is preferably 15 nm or more. Thereby, high oscillation intensity can be obtained. The sum ts may be, for example, 40 nm or less. For example, the recording gap can be shortened. For example, a high recording density is easily obtained.

Figure 8A:
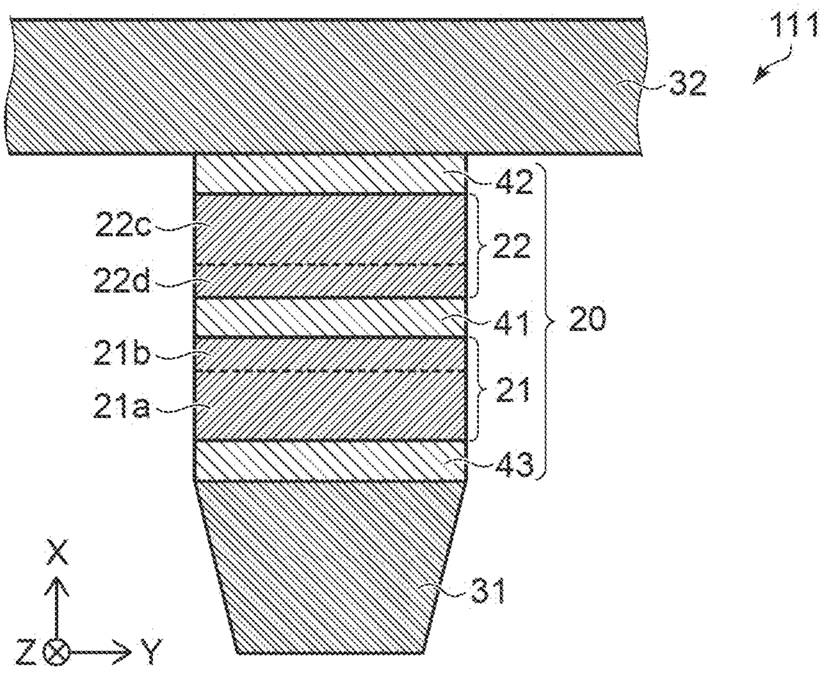
FIGS. 8A and 8B are schematic plan views illustrating the magnetic head according to the first embodiment.
Figure 8B:
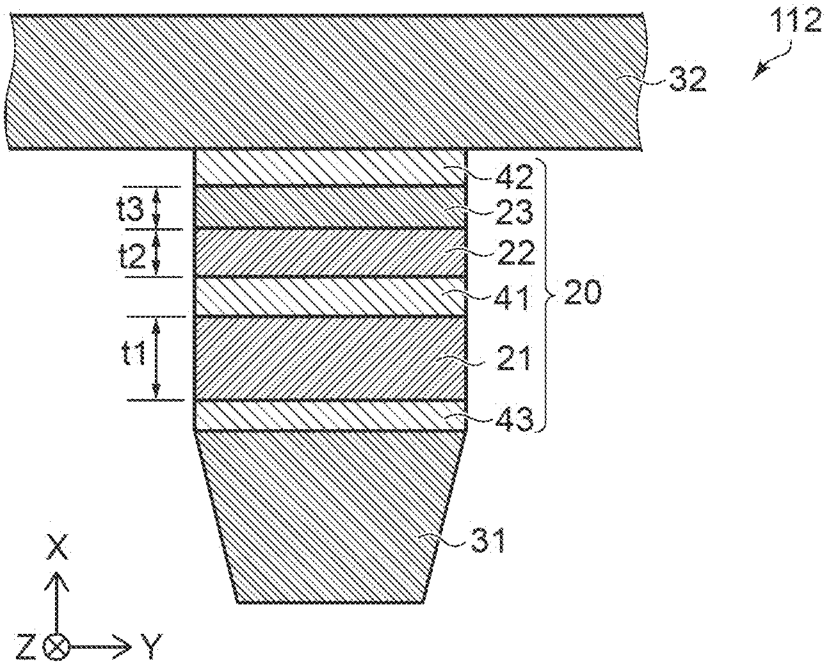

FIGS. 8A and 8B are schematic plan views illustrating the magnetic head according to the first embodiment.

As shown in FIG. 8A, a magnetic head 111 according to the embodiment includes the first magnetic pole 31, the second magnetic pole 32, and the magnetic element 20. In the magnetic head 111, the magnetic element 20 also includes the first magnetic layer 21, the second magnetic layer 22, the first non-magnetic layer 41, the second non-magnetic layer 42, and the third non-magnetic layer 43. In the magnetic head 111, at least one of the first magnetic layer 21 or the second magnetic layer 22 includes a plurality of regions. The configuration of the magnetic head 111 except for this may be the same as the configuration of the magnetic head 110.

For example, the first magnetic layer 21 includes a first magnetic region 21*a* and a second magnetic region 21*b*. The second magnetic region 21*b* is provided between the first magnetic region 21*a* and the first non-magnetic layer 41. For example, a saturation magnetization of the first magnetic region 21*a* is greater than a saturation magnetization of the second magnetic region 21*b*. Thereby, it becomes easier to obtain stable oscillation, for example.

For example, the saturation magnetization of the first magnetic region 21*a* is 1.2 times or more the saturation magnetization of the second magnetic region 21*b*. Thereby, it becomes easier to obtain stable oscillation. The saturation magnetization of the first magnetic region 21*a* may be 3 times or less the saturation magnetization of the second magnetic region 21*b*. Thereby, it becomes easier to obtain stable oscillation.

For example, a concentration of Fe in the first magnetic region 21*a* is higher than a concentration of Fe in the second magnetic region 21*b*. For example, the saturation magnetization of the first magnetic region 21*a* is more likely to be greater than the saturation magnetization of the second magnetic region 21*b*. For example, a concentration of Ni in the first magnetic region 21*a* is lower than a concentration of Ni in the second magnetic region 21*b*. As a result, for example, the saturation magnetization of the first magnetic region 21*a* is more likely to be greater than the saturation magnetization of the second magnetic region 21*b*. The boundary between the first magnetic region 21*a* and the second magnetic region 21*b* may be clear or unclear.

For example, the second magnetic layer 22 includes a third magnetic region 22*c* and a fourth magnetic region 22*d*. The fourth magnetic region 22*d* is provided between the third magnetic region 22*c* and the first non-magnetic layer 41. For example, a saturation magnetization of the third magnetic region 22*c* is greater than a saturation magnetization of the fourth magnetic region 22*d*. Thereby, it becomes easier to obtain stable oscillation, for example.

For example, a saturation magnetization of the third magnetic region 22*c* is 1.2 times or more a saturation magnetization of the fourth magnetic region 22*d*. Thereby, it becomes easier to obtain stable oscillation. The saturation magnetization of the third magnetic region 22*c* may be 3 times or less the saturation magnetization of the fourth magnetic region 22*d*. Thereby, it becomes easier to obtain stable oscillation.

For example, a concentration of Fe in the third magnetic region 22*c* is higher than a concentration of Fe in the fourth magnetic region 22*d*. Thereby, it becomes easier for the saturation magnetization of the third magnetic region 22*c* to be greater than the saturation magnetization of the fourth magnetic region 22*d*. For example, a concentration of the second element in the third magnetic region 22*c* is lower than a concentration of the second element in the fourth magnetic region 22*d*. Thereby, it becomes easier for the saturation magnetization of the third magnetic region 22*c* to be greater than the saturation magnetization of the fourth magnetic region 22*d*. The boundary between the third magnetic region 22*c* and the fourth magnetic region 22*d* may be clear or unclear.

As shown in FIG. 8B, a magnetic head 112 according to the embodiment includes the first magnetic pole 31, the second magnetic pole 32, and the magnetic element 20. In the magnetic head 112, the magnetic element 20 includes a third magnetic layer 23 in addition to the first magnetic layer 21, the second magnetic layer 22, the first non-magnetic layer 41, the second non-magnetic layer 42, and the third non-magnetic layer 43. The configurations of the magnetic head 112 except for this may be the same as the configuration of the magnetic head 110 or the magnetic head 111.

The third magnetic layer 23 is provided between the second magnetic layer 22 and the second non-magnetic layer 42. The third magnetic layer 23 includes a first element including at least one of Fe, Co, and Ni. The third magnetic layer 23 does not include a second element. Alternatively, a concentration of the second element in the third magnetic layer 23 is lower than a concentration of the second element in the second magnetic layer 22. As already explained, the second element includes at least one selected from the group consisting of Cr, V, Mn, Ti, and Sc.

For example, a saturation magnetization of the third magnetic layer 23 is higher than a saturation magnetization of the second magnetic layer 22. Thereby, it becomes easier to obtain stable oscillation, for example. The boundary between the third magnetic layer 23 and the first magnetic layer 21 may be clear or unclear. The third magnetic layer 23 may be continuous with the second magnetic layer 22.

In the magnetic head 112, the first thickness t1 of the first magnetic layer 21 is, for example, not less than 0.8 times and not more than 1.25 times a sum of the third thickness t3 of the third magnetic layer 23 and the second thickness t2 of the second magnetic layer 22 along the first direction (the direction from the first magnetic pole 31 to the second magnetic pole 32). For example, high oscillation strength is obtained. Stable oscillation is obtained.

Below, an example of the magnetic head and magnetic recording medium 80 included in the magnetic recording device 210 according to the embodiment will be described.

Figure 9:
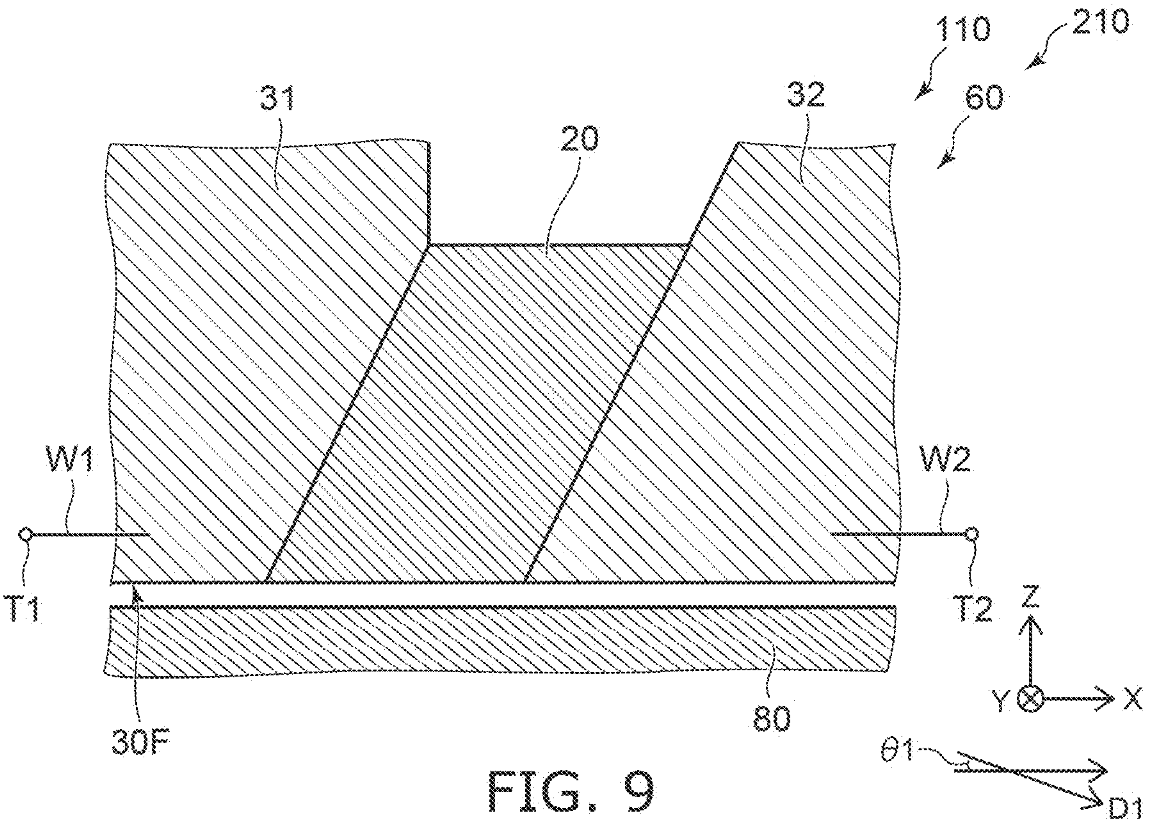
FIG. 9 is a schematic cross-sectional view illustrating the magnetic head according to the embodiment.

FIG. 9 is a schematic cross-sectional view illustrating the magnetic head according to the embodiment.

As shown in FIG. 9, in the magnetic head according to the embodiment (e.g., magnetic head 110), the first direction D1 from the first magnetic pole 31 to the second magnetic pole 32 may be inclined with respect to the X-axis direction. The first direction D1 corresponds to the stacking direction in the magnetic element 20. The X-axis direction is along the medium facing face 30F. The angle between the first direction D1 and the medium facing face 30F is defined as angle θ1. The angle θ1 is, for example, not less than 15 degrees and not more than 30 degrees. The angle θ1 may be 0 degrees.

In the case where the first direction D1 is inclined with respect to the X-axis direction, the thickness of the layer corresponds to the length along the first direction D1. The configuration in which the first direction D1 is inclined with respect to the X-axis direction may be applied to any magnetic head according to the embodiment. For example, the interface between the first magnetic pole 31 and the magnetic element 20, and the interface between the magnetic element 20 and the second magnetic pole 32 may be inclined with respect to the X-axis direction.

Below, an example of the magnetic head and magnetic recording medium 80 included in the magnetic recording device 210 according to the embodiment will be described.

Figure 10:
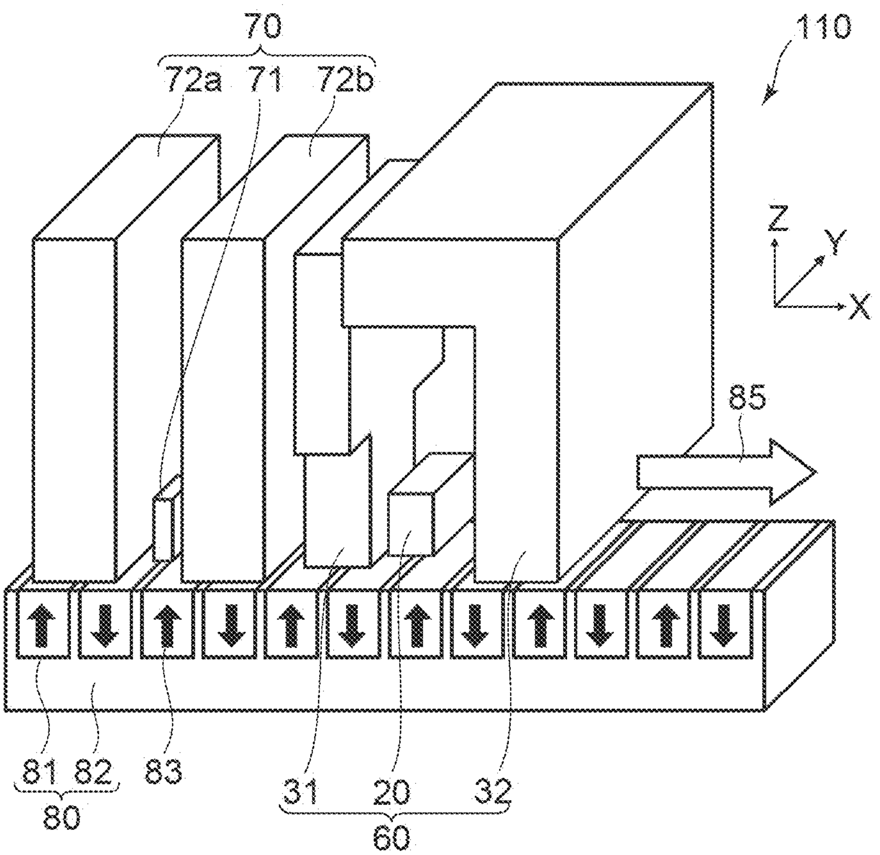
FIG. 10 is a schematic perspective view illustrating a magnetic recording device according to the embodiment.

FIG. 10 is a schematic perspective view illustrating a magnetic recording device according to the embodiment.

As shown in FIG. 10, the magnetic head according to the embodiment (e.g., magnetic head 110) is used together with the magnetic recording medium 80. In this example, the magnetic head 110 includes the recording section 60 and a reproducing section 70. The recording section 60 of the magnetic head 110 records information on the magnetic recording medium 80. The reproducing section 70 reproduces the information recorded on the magnetic recording medium 80.

The magnetic recording medium 80 includes, for example, a medium substrate 82 and a magnetic recording layer 81 provided on the medium substrate 82. The magnetization 83 of the magnetic recording layer 81 is controlled by the recording section 60.

The reproducing section 70 includes, for example, a first reproducing magnetic shield 72*a*, a second reproducing magnetic shield 72*b*, and a magnetic reproducing element 71. The magnetic reproducing element 71 is provided between the first reproducing magnetic shield 72*a* and the second reproducing magnetic shield 72*b*. The magnetic reproducing element 71 can output a signal corresponding to the magnetization 83 of the magnetic recording layer 81.

As shown in FIG. 10, the magnetic recording medium 80 moves relative to the magnetic head 110 in the medium movement direction 85. The magnetic head 110 controls information corresponding to the magnetization 83 of the magnetic recording layer 81 at a desired position. The magnetic head 110 reproduces information corresponding to the magnetization 83 of the magnetic recording layer 81 at a desired position.

Figure 11:
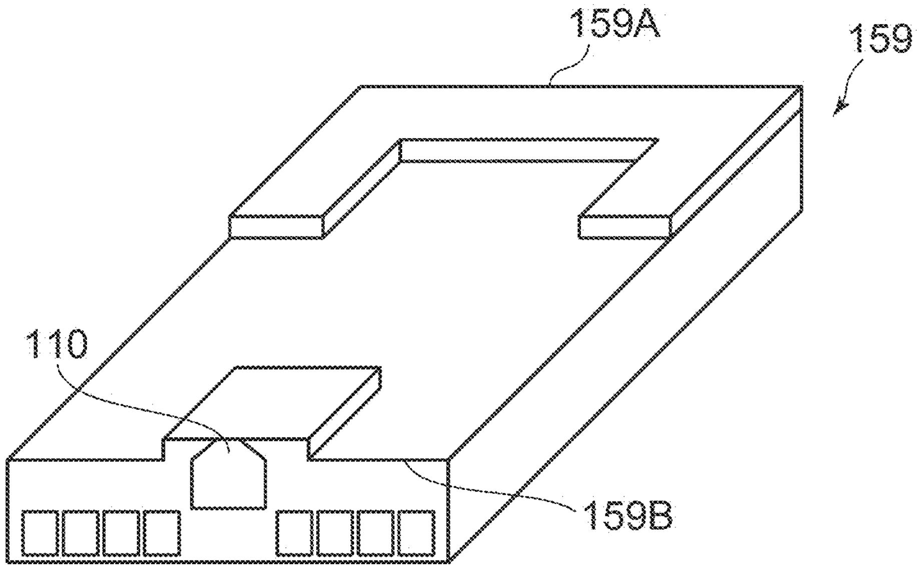
FIG. 11 is a schematic perspective view illustrating a part of the magnetic recording device according to the embodiment.

FIG. 11 is a schematic perspective view illustrating a part of the magnetic recording device according to the embodiment.

FIG. 11 illustrates a head slider.

The magnetic head 110 is provided on the head slider 159. The head slider 159 includes, for example, $Al_2O_3$/TiC or the like. The head slider 159 moves relative to the magnetic recording medium while floating or in contact with the magnetic recording medium.

The head slider 159 includes, for example, an air inflow side 159A and an air outflow side 159B. The magnetic head 110 is arranged on the side surface of the air outflow side 159B of the head slider 159 or the like. As a result, the magnetic head 110 moves relative to the magnetic recording medium while flying above or in contact with the magnetic recording medium.

Figure 12:
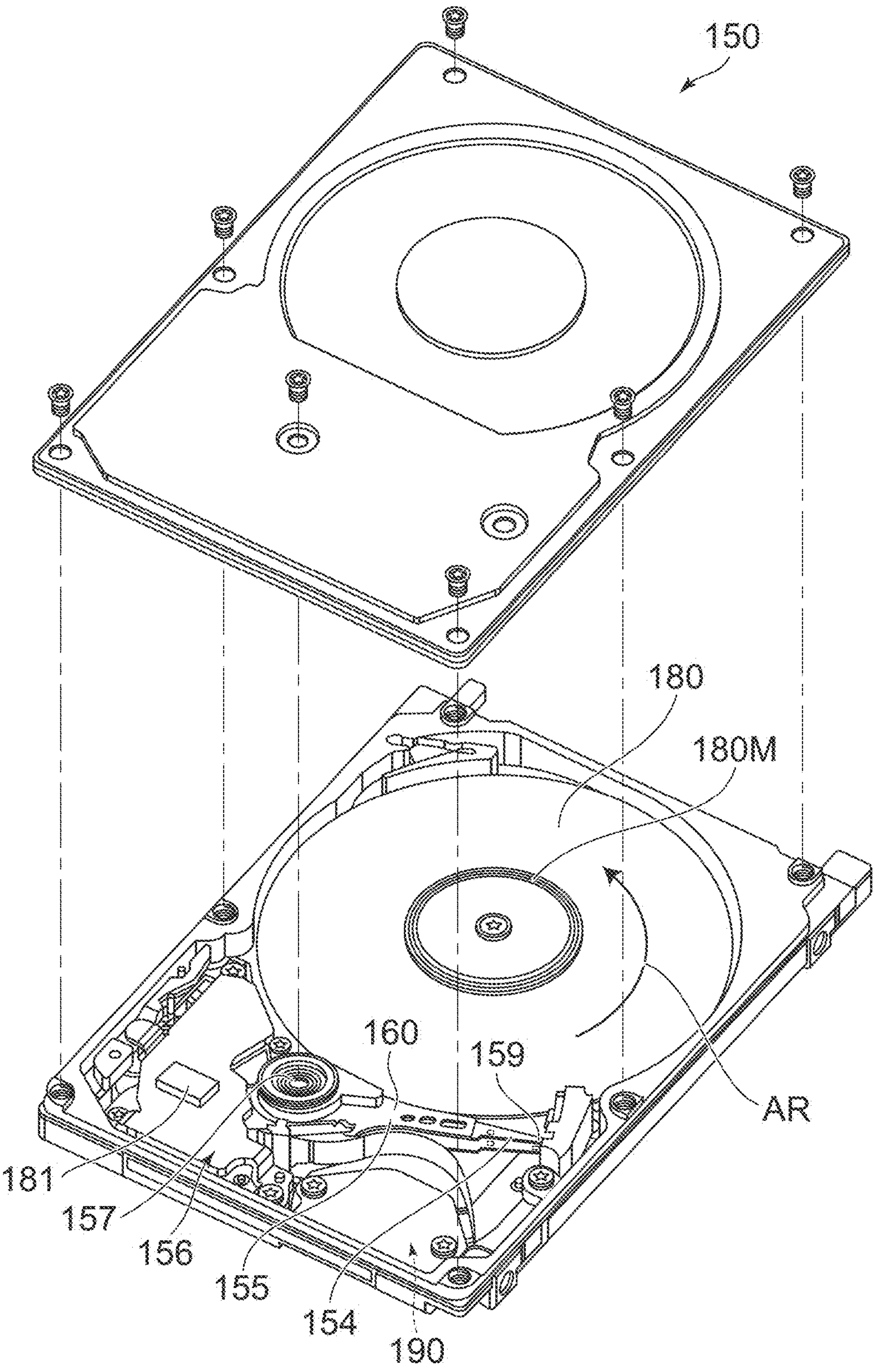
FIG. 12 is a schematic perspective view illustrating the magnetic recording device according to the embodiment.

FIG. 12 is a schematic perspective view illustrating the magnetic recording device according to the embodiment.

As shown in FIG. 12, in a magnetic recording device 150 according to the embodiment, a rotary actuator is used. The recording medium disk 180 is connected to a spindle motor 180M. The recording medium disk 180 is rotated in a direction of arrow AR by the spindle motor 180M. The spindle motor 180M is responsive to control signals from the drive device controller. The magnetic recording device 150 according to the embodiment may include the multiple recording medium disks 180. The magnetic recording device 150 may include a recording medium 181. The recording medium 181 is, for example, an SSD (Solid State Drive). A non-volatile memory such as a flash memory is used for the recording medium 181, for example. For example, the magnetic recording device 150 may be a hybrid HDD (Hard Disk Drive).

The head slider 159 records and reproduces information to be recorded on the recording medium disk 180. The head slider 159 is provided at an end of a thin-film suspension 154. A magnetic head according to the embodiment is provided near the end of the head slider 159.

While the recording medium disk 180 is rotating, the pressing pressure by the suspension 154 and the floating pressure generated at the medium facing face (ABS) of the head slider 159 are balanced. The distance between the medium facing face of the head slider 159 and the surface of the recording medium disk 180 is the predetermined fly height. In the embodiment, the head slider 159 may contact the recording medium disk 180. For example, a contact sliding type may be applied.

The suspension 154 is connected to one end of an arm 155 (e.g., an actuator arm). The arm 155 includes, for example, a bobbin part or the like. The bobbin part holds a drive coil. A voice coil motor 156 is provided at the other end of the arm 155. The voice coil motor 156 is a type of linear motor. The voice coil motor 156 includes, for example, a drive coil and a magnetic circuit. The drive coil is wound on the bobbin part of the arm 155. The magnetic circuit includes permanent magnets and opposing yokes. The drive coil is provided between the permanent magnet and the opposing yoke. The suspension 154 includes one end and the other end. The magnetic head is provided at one end of the suspension 154. The arm 155 is connected to the other end of the suspension 154.

The arm 155 is held by ball bearings. Ball bearings are provided at two locations above and below a bearing part 157. The arm 155 can be rotated and slid by the voice coil motor 156. The magnetic head can move to any position on the recording medium disk 180.

Figure 13A:
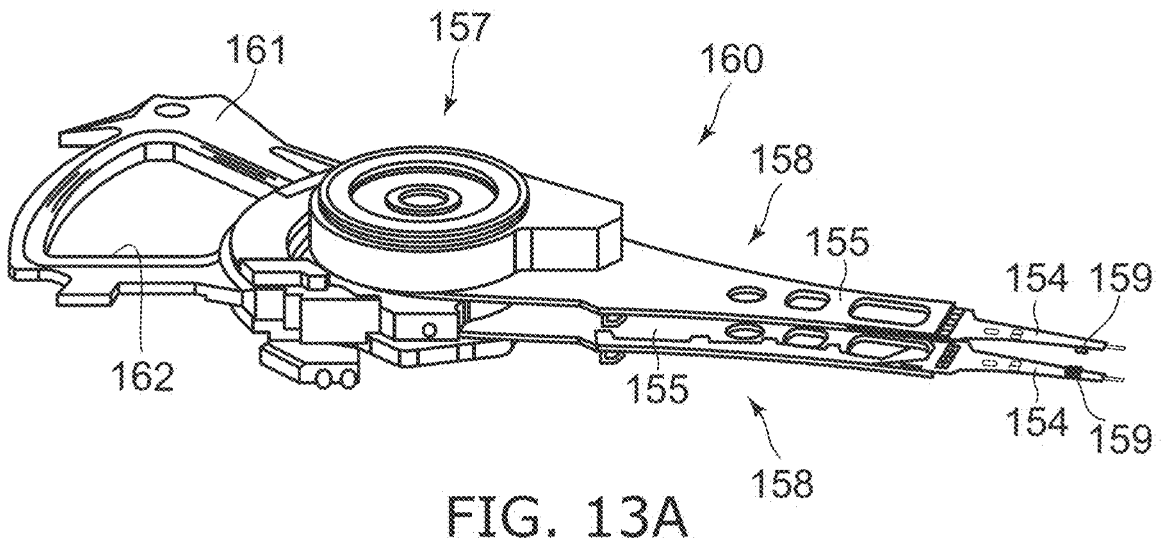
FIGS. 13A and 13B are schematic perspective views illustrating a part of the magnetic recording device according to the embodiment.
Figure 13B:
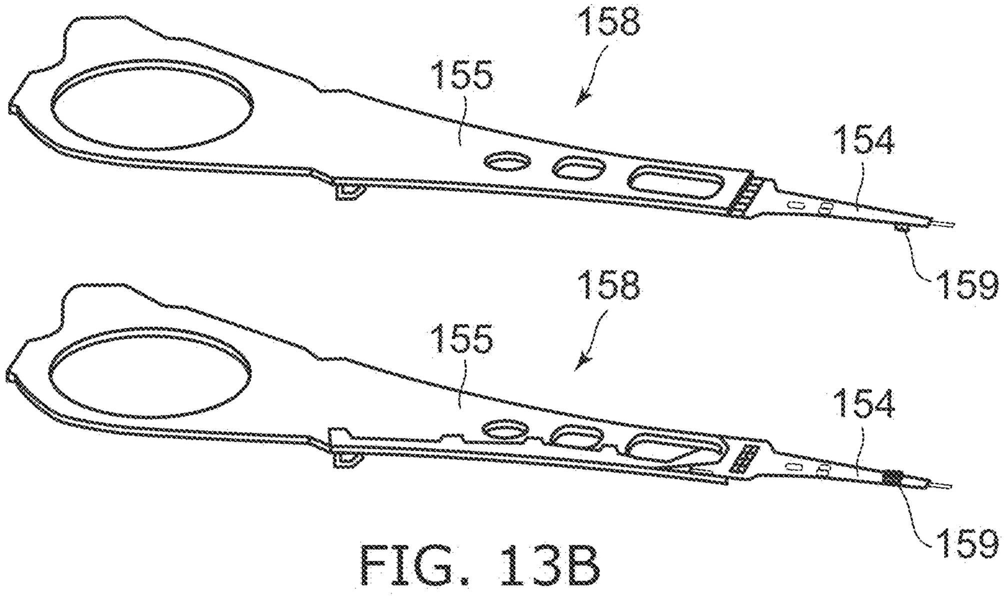

FIGS. 13A and 13B are schematic perspective views illustrating a part of the magnetic recording device according to the embodiment.

FIG. 13A is an enlarged perspective view of the head stack assembly 160, illustrating the configuration of a part of the magnetic recording device.

FIG. 13B is a perspective view illustrating the magnetic head assembly (head gimbal assembly: HGA) 158 that forms part of the head stack assembly 160.

As shown in FIG. 13A, the head stack assembly 160 includes the bearing part 157, the magnetic head assembly 158 and a support frame 161. The magnetic head assembly 158 extends from the bearing part 157. The support frame 161 extends from the bearing part 157. A direction in which the support frame 161 extends is opposite to a direction in which the magnetic head assembly 158 extends. The support frame 161 supports a coil 162 of the voice coil motor 156.

As shown in FIG. 13B, the magnetic head assembly 158 includes the arm 155 extending from the bearing part 157 and the suspension 154 extending from the arm 155.

The head slider 159 is provided at the end of the suspension 154. The head slider 159 is provided with the magnetic head according to the embodiment.

The magnetic head assembly 158 (head gimbal assembly) according to the embodiment includes the magnetic head according to the embodiment, the head slider 159 provided with the magnetic head, the suspension 154 and the arm 155. The head slider 159 is provided at one end of the suspension 154. The arm 155 is connected to the other end of the suspension 154.

The suspension 154 may include, for example, a wiring (not shown) for recording and reproducing signals. The suspension 154 may include, for example, a heater wiring (not shown) for adjusting the fly height. The suspension 154 may include a wiring (not shown) for, for example, an oscillator element or the like. These wires may be electrically connected to multiple electrodes provided on the magnetic head.

A signal processor 190 is provided in the magnetic recording device 150. The signal processor 190 uses a magnetic head to record and reproduce signals on a magnetic recording medium. Input/output lines of the signal processor 190 are connected to, for example, electrode pads of the magnetic head assembly 158 and electrically connected to the magnetic head.

The magnetic recording device 150 according to the embodiment includes the magnetic recording medium, the magnetic head according to the embodiment, a movable part, a position controller, and a signal processor. The movable part separates the magnetic recording medium from the magnetic head or makes them relatively movable while they are in contact with each other. The position controller aligns the magnetic head with a predetermined recording position on the magnetic recording medium. The signal processor records and reproduces signals on the magnetic recording medium using the magnetic head.

For example, the recording medium disk 180 is used as the above magnetic recording medium. The movable part includes, for example, the head slider 159. The position controller described above includes, for example, the magnetic head assembly 158.

The embodiments may include the following Technical proposals:

Technical Proposal 1

A magnetic recording device, comprising:
a magnetic head; and
a controller,
the magnetic head including:
a first magnetic pole,
a second magnetic pole,
a magnetic element provided between the first magnetic pole and the second magnetic pole,
a coil,
a first terminal, and
a second terminal,
the first terminal being electrically connected to a part of the magnetic element,
the second terminal being electrically connected to another part of the magnetic element,
the magnetic element includes:
a first magnetic layer,
a second magnetic layer provided between the first magnetic layer and the second magnetic pole,
a first non-magnetic layer provided between the first magnetic layer and the second magnetic layer,
a second non-magnetic layer provided between the second magnetic layer and the second magnetic pole,
a third non-magnetic layer provided between the first magnetic pole and the first magnetic layer,
wherein
when a first coil current of a first frequency is supplied to the coil and a first current is supplied between the first terminal and the second terminal, a first signal having a first signal strength of a first component at the first frequency is generated between the first terminal and the second terminal,
when the first coil current is supplied to the coil and a second current is supplied between the first terminal and the second terminal, a second signal having a second signal strength of a second component at the first frequency is generated between the first terminal and the second terminal,
an absolute value of the first coil current is greater than or equal to a coil current value,
the first current has a first direction from the first magnetic layer to the second magnetic layer,
the second current has a second direction from the second magnetic layer to the first magnetic layer,
a second absolute value of the second current is the same as a first absolute value of the first current,
a change in an absolute value of a difference between a time integration of the first signal strength and a time integration of the second signal strength when the first absolute value is changed includes a first peak and a second peak,
a first current value of the first absolute value corresponds to the first peak,
a second current value of the first absolute value corresponds to the second peak,
the first current value is greater than the second current value,
the controller is configured to perform a first operation,
in the first operation, the controller is configured to supply a recording coil current to the coil while supplying a recording element current to the magnetic element,
an absolute value of the recording coil current is equal to or greater than the coil current value, and
the recording element current is equal to or less than the first current value.

Technical Proposal 2

The magnetic recording device according to Technical proposal 1, wherein
the recording element current is equal to or greater than the second current value.

Technical Proposal 3

The magnetic recording device according to Technical proposal 1 or 2, wherein
the first current value is not less than 2.5 times and not more than 3.5 times the second current value.

Technical Proposal 4

The magnetic recording device according to any one of Technical proposals 1-3, wherein when a second coil current of DC is supplied to the coil and a magnitude of a third current supplied between the first terminal and the second terminal is changed, a change in a differential resistance of the magnetic element with respect to a change in the magnitude of the third current includes a valley in the third current of a first valley current value, an absolute value of the second coil current is equal to or greater than the coil current value, the third current has the first direction, and the recording element current is equal to or less than the first valley current value.

Technical Proposal 5

The magnetic recording device according to Technical proposal 4, wherein the first valley current value is not less than 2.5 times and not more than 3.5 times the second current value.

Technical Proposal 6

A magnetic recording device, comprising:

a magnetic head; and a controller, the magnetic head including:

a first magnetic pole, a second magnetic pole, a magnetic element provided between the first magnetic pole and the second magnetic pole, a coil, a first terminal, and a second terminal, the first terminal being electrically connected to a part of the magnetic element, the second terminal being electrically connected to another part of the magnetic element, the magnetic element includes:

a first magnetic layer, a second magnetic layer provided between the first magnetic layer and the second magnetic pole, a first non-magnetic layer provided between the first magnetic layer and the second magnetic layer, a second non-magnetic layer provided between the second magnetic layer and the second magnetic pole, a third non-magnetic layer provided between the first magnetic pole and the first magnetic layer, wherein when a second coil current of DC is supplied to the coil and a magnitude of a third current supplied between the first terminal and the second terminal is changes, a change in the differential resistance of the magnetic element with respect to the change in the magnitude of the third current includes a valley in the third current of a first valley current value, an absolute value of the second coil current is equal to or greater than a coil current value, the third current has a first direction from the first magnetic layer to the second magnetic layer, the controller is configured to perform a first operation, in the first operation, the controller is configured to supply a recording coil current to the coil while supplying a recording element current to the magnetic element, an absolute value of the recording coil current is equal to or greater than the coil current value, and the recording element current is equal to or less than the first valley current value.

Technical Proposal 7

The magnetic recording device according to Technical proposal 6, wherein the recording element current is 0.3 times or more the first valley current value.

Technical Proposal 8

The magnetic recording device according to any one of Technical proposals 1-7, wherein the first magnetic layer includes a first element including at least one of Fe, Co, and Ni, the second magnetic layer includes the first element and a second element including at least one selected from the group consisting of Cr, V, Mn, Ti, and Sc, and the first magnetic layer does not include the second element, or a concentration of the second element in the first magnetic layer is lower than a concentration of the second element in the second magnetic layer.

Technical Proposal 9

The magnetic recording device according to Technical proposal 8, wherein the magnetic element further includes a third magnetic layer, the third magnetic layer is provided between the second magnetic layer and the second non-magnetic layer, the third magnetic layer includes at least one of Fe, Co, and Ni, the third magnetic layer does not include the second element, or a concentration of the second element in the third magnetic layer is lower than a concentration of the second element in the second magnetic layer.

Technical Proposal 10

The magnetic recording device according to Technical proposal 8 or 9, wherein a concentration of the second element in the second magnetic layer is not less than 10 atomic % and not more than 80 atomic %.

Technical Proposal 11

The magnetic recording device according to any one of Technical proposals 1-10, wherein a first thickness of the first magnetic layer along a first direction from the first magnetic pole to the second magnetic pole is not less than 0.25 times and not more than 4 times a second thickness of the second magnetic layer along the first direction.

Technical Proposal 12

The magnetic recording device according to any one of Technical proposals 1-11, wherein the first magnetic layer includes a first magnetic region and a second magnetic region, the second magnetic region is provided between the first magnetic region and the first non-magnetic layer, and a saturation magnetization of the first magnetic region is greater than a saturation magnetization of the second magnetic region.

Technical Proposal 13

The magnetic recording device according to any one of Technical proposals 1-12, wherein the second magnetic layer includes a third magnetic region and a fourth magnetic region, the fourth magnetic region is provided between the third magnetic region and the first non-magnetic layer, and a saturation magnetization of the third magnetic region is greater than a saturation magnetization of the fourth magnetic region.

Technical Proposal 14

The magnetic recording device according to any one of Technical proposals 1-13, wherein the third non-magnetic layer is in contact with the first magnetic pole and the first magnetic layer.

Technical Proposal 15

The magnetic recording device according to any one of Technical proposals 1-14, wherein the first non-magnetic layer is in contact with the first magnetic layer and the second magnetic layer.

Technical Proposal 16

The magnetic recording device according to any one of Technical proposals 1-8, wherein the second non-magnetic layer is in contact with the second magnetic layer and the second magnetic pole.

Technical Proposal 17

The magnetic recording device according to any one of Technical proposals 1-16, wherein at least one of the first non-magnetic layer, the second non-magnetic layer, or the third non-magnetic layer includes a third element including at least one selected from the group consisting of Cu, Au, Cu, V, Al, and Ag.

Technical Proposal 18

The magnetic recording device according to any one of Technical proposals 1-11, wherein the first magnetic layer includes a first magnetic region and a second magnetic region, the second magnetic region is provided between the first magnetic region and the first non-magnetic layer, and a concentration of Fe in the first magnetic region is higher than a concentration of Fe in the second magnetic region.

Technical Proposal 19

The magnetic recording device according to any one of Technical proposals 1-12, wherein the second magnetic layer includes a third magnetic region and a fourth magnetic region, the fourth magnetic region is provided between the third magnetic region and the first non-magnetic layer, and a concentration of Fe in the third magnetic region is higher than a concentration of Fe in the fourth magnetic region.

Technical Proposal 20

The magnetic recording device according to any one of Technical proposals 1-19, wherein in the first operation, an alternating magnetic field is generated from the magnetic element.

According to the embodiment, a magnetic recording device capable of improving recording density can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic recording devices such as magnetic heads, magnetic poles, magnetic elements, magnetic layers, non-magnetic layers, wirings, magnetic recording medium, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording devices practicable by an appropriate design modification by one skilled in the art based on the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording device, comprising:

a magnetic head; and a controller, the magnetic head including:

a first magnetic pole, a second magnetic pole, a magnetic element provided between the first magnetic pole and the second magnetic pole, a coil, a first terminal, and a second terminal, the first terminal being electrically connected to a part of the magnetic element, the second terminal being electrically connected to another part of the magnetic element, the magnetic element includes:

a first magnetic layer, a second magnetic layer provided between the first magnetic layer and the second magnetic pole, a first non-magnetic layer provided between the first magnetic layer and the second magnetic layer, a second non-magnetic layer provided between the second magnetic layer and the second magnetic pole, a third non-magnetic layer provided between the first magnetic pole and the first magnetic layer, wherein when a first coil current of a first frequency is supplied to the coil and a first current is supplied between the first terminal and the second terminal, a first signal having a first signal strength of a first component at the first frequency is generated between the first terminal and the second terminal, when the first coil current is supplied to the coil and a second current is supplied between the first terminal and the second terminal, a second signal having a second signal strength of a second component at the first frequency is generated between the first terminal and the second terminal, an absolute value of the first coil current is greater than or equal to a coil current value, the first current has a first direction from the first magnetic layer to the second magnetic layer, the second current has a second direction from the second magnetic layer to the first magnetic layer, a second absolute value of the second current is the same as a first absolute value of the first current, a change in an absolute value of a difference between a time integration of the first signal strength and a time integration of the second signal strength when the first absolute value is changed includes a first peak and a second peak, a first current value of the first absolute value corresponds to the first peak, a second current value of the first absolute value corresponds to the second peak, the first current value is greater than the second current value, the controller is configured to perform a first operation, in the first operation, the controller is configured to supply a recording coil current to the coil while supplying a recording element current to the magnetic element, an absolute value of the recording coil current is equal to or greater than the coil current value, and the recording element current is equal to or less than the first current value.

2. The magnetic recording device according to claim 1, wherein the recording element current is equal to or greater than the second current value.

3. The magnetic recording device according to claim 1, wherein the first current value is not less than 2.5 times and not more than 3.5 times the second current value.

4. The magnetic recording device according to claim 1, wherein when a second coil current of DC is supplied to the coil and a magnitude of a third current supplied between the first terminal and the second terminal is changed, a change in a differential resistance of the magnetic element with respect to a change in the magnitude of the third current includes a valley in the third current of a first valley current value, an absolute value of the second coil current is equal to or greater than the coil current value, the third current has the first direction, and the recording element current is equal to or less than the first valley current value.

5. The magnetic recording device according to claim 4, wherein the first valley current value is not less than 2.5 times and not more than 3.5 times the second current value.

6. The magnetic recording device according to claim 1, wherein the first magnetic layer includes a first element including at least one of Fe, Co, and Ni, the second magnetic layer includes the first element and a second element including at least one selected from the group consisting of Cr, V, Mn, Ti, and Sc, and the first magnetic layer does not include the second element, or a concentration of the second element in the first magnetic layer is lower than a concentration of the second element in the second magnetic layer.

7. The magnetic recording device according to claim 6, wherein the magnetic element further includes a third magnetic layer, the third magnetic layer is provided between the second magnetic layer and the second non-magnetic layer, the third magnetic layer includes at least one of Fe, Co, and Ni, the third magnetic layer does not include the second element, or a concentration of the second element in the third magnetic layer is lower than a concentration of the second element in the second magnetic layer.

8. The magnetic recording device according to claim 6, wherein a concentration of the second element in the second magnetic layer is not less than 10 atomic % and not more than 80 atomic %.

9. The magnetic recording device according to claim 1, wherein a first thickness of the first magnetic layer along a first direction from the first magnetic pole to the second magnetic pole is not less than 0.25 times and not more than 4 times a second thickness of the second magnetic layer along the first direction.

10. The magnetic recording device according to claim 1, wherein the first magnetic layer includes a first magnetic region and a second magnetic region, the second magnetic region is provided between the first magnetic region and the first non-magnetic layer, and a saturation magnetization of the first magnetic region is greater than a saturation magnetization of the second magnetic region.

11. The magnetic recording device according to claim 1, wherein the second magnetic layer includes a third magnetic region and a fourth magnetic region, the fourth magnetic region is provided between the third magnetic region and the first non-magnetic layer, and a saturation magnetization of the third magnetic region is greater than a saturation magnetization of the fourth magnetic region.

12. The magnetic recording device according to claim 1, wherein the third non-magnetic layer is in contact with the first magnetic pole and the first magnetic layer.

13. The magnetic recording device according to claim 1, wherein the first non-magnetic layer is in contact with the first magnetic layer and the second magnetic layer.

14. The magnetic recording device according to claim 1, wherein the second non-magnetic layer is in contact with the second magnetic layer and the second magnetic pole.

15. The magnetic recording device according to claim 1, wherein at least one of the first non-magnetic layer, the second non-magnetic layer, or the third non-magnetic layer includes a third element including at least one selected from the group consisting of Cu, Au, Cu, V, Al, and Ag.

16. The magnetic recording device according to claim 1, wherein the first magnetic layer includes a first magnetic region and a second magnetic region, the second magnetic region is provided between the first magnetic region and the first non-magnetic layer, and a concentration of Fe in the first magnetic region is higher than a concentration of Fe in the second magnetic region.

17. The magnetic recording device according to claim 1, wherein the second magnetic layer includes a third magnetic region and a fourth magnetic region, the fourth magnetic region is provided between the third magnetic region and the first non-magnetic layer, and a concentration of Fe in the third magnetic region is higher than a concentration of Fe in the fourth magnetic region.

18. The magnetic recording device according to claim 1, wherein in the first operation, an alternating magnetic field is generated from the magnetic element.

19. A magnetic recording device, comprising:

a magnetic head; and a controller, the magnetic head including:

a first magnetic pole, a second magnetic pole, a magnetic element provided between the first magnetic pole and the second magnetic pole, a coil, a first terminal, and a second terminal, the first terminal being electrically connected to a part of the magnetic element, the second terminal being electrically connected to another part of the magnetic element, the magnetic element includes:

a first magnetic layer, a second magnetic layer provided between the first magnetic layer and the second magnetic pole, a first non-magnetic layer provided between the first magnetic layer and the second magnetic layer, a second non-magnetic layer provided between the second magnetic layer and the second magnetic pole, a third non-magnetic layer provided between the first magnetic pole and the first magnetic layer, wherein when a second coil current of DC is supplied to the coil and a magnitude of a third current supplied between the first terminal and the second terminal changes, a change in the differential resistance of the magnetic element with respect to the change in the magnitude of the third current includes a valley in the third current of a first valley current value, an absolute value of the second coil current is equal to or greater than a coil current value, the third current has a first direction from the first magnetic layer to the second magnetic layer, the controller is configured to perform a first operation, in the first operation, the controller is configured to supply a recording coil current to the coil while supplying a recording element current to the magnetic element, an absolute value of the recording coil current is equal to or greater than the coil current value, and the recording element current is equal to or less than the first valley current value.

20. The magnetic recording device according to claim 19, wherein the recording element current is 0.3 times or more the first valley current value.

* * * * *